United States Patent [19]

Bertram et al.

[11] Patent Number: 5,503,937

[45] Date of Patent: Apr. 2, 1996

[54] CURABLE COMPOSITION WHICH COMPRISES ADDUCTS OF HETEROCYCLIC COMPOUNDS

[75] Inventors: James L. Bertram, Lake Jackson; Louis L. Walker, Clute; John W. Muskopf, Lake Jackson, all of Tex.

[73] Assignee: The Dow Chemical Company, Midland, Mich.

[21] Appl. No.: 192,465

[22] Filed: Feb. 7, 1994

Related U.S. Application Data

[60] Division of Ser. No. 894,416, Jun. 5, 1992, abandoned, and a continuation-in-part of Ser. No. 894,416, which is a division of Ser. No. 555,350, Jul. 18, 1990, Pat. No. 5,134,239, which is a division of Ser. No. 274,227, Nov. 18, 1988, abandoned, which is a continuation-in-part of Ser. No. 155,381, Feb. 12, 1988, abandoned, which is a continuation-in-part of Ser. No. 21,837, Mar. 4, 1987, Pat. No. 4,725,652, which is a continuation-in-part of Ser. No. 849,087, Apr. 7, 1986, abandoned, which is a continuation-in-part of Ser. No. 716,279, Mar. 25, 1985, Pat. No. 4,594,241, which is a continuation-in-part of Ser. No. 631,672, Jul. 17, 1984, abandoned.

[51] Int. Cl.$^6$ ............................. C08G 59/62; C08G 59/14
[52] U.S. Cl. ................. 428/414; 252/182.23; 252/182.3; 252/182.31; 428/416; 428/418; 525/482; 525/485
[58] Field of Search ............................. 548/335.1, 343.5, 548/405, 122, 146, 215, 304.4, 335.1, 405, 469; 544/2, 35, 107, 224, 264, 283, 347, 353, 358; 546/152, 184, 347; 549/29, 49; 556/68; 252/182; 428/414, 416, 418; 525/482, 485

[56] References Cited

U.S. PATENT DOCUMENTS

| | | | |
|---|---|---|---|
| 3,048,552 | 8/1962 | Fang | 260/28.5 |
| 3,277,050 | 10/1966 | Pettigrew | 260/47 |
| 3,477,990 | 11/1969 | Dante et al. | 260/47 |
| 3,493,630 | 2/1970 | Salensky | 260/831 |
| 3,547,881 | 12/1970 | Mueller et al. | 260/47 |
| 3,565,861 | 2/1971 | White et al. | 260/47 |
| 3,591,556 | 7/1971 | Godfrey et al. | 260/47 |
| 3,687,894 | 9/1972 | Collings et al. | 528/104 X |
| 3,694,407 | 9/1972 | Krikorian | 260/47 EP |
| 3,725,341 | 1/1973 | Kegers et al. | 528/104 X |
| 3,738,862 | 6/1973 | Klarquist et al. | 528/104 X |
| 3,794,619 | 2/1974 | Hasegawa et al. | 260/47 EP |
| 3,859,379 | 1/1975 | Kitamura et al. | 260/831 |
| 3,899,546 | 8/1975 | Stoy et al. | 260/834 |
| 3,919,169 | 11/1975 | Ramsey et al. | 528/89 X |
| 3,947,395 | 3/1976 | Ogata et al. | 260/28 P |
| 3,948,855 | 4/1976 | Perry | 260/47 EP |
| 4,026,862 | 5/1977 | Smith et al. | 528/89 X |
| 4,069,055 | 1/1978 | Crivello | 528/92 X |
| 4,136,102 | 1/1979 | Crivello | 522/31 X |
| 4,150,988 | 4/1979 | Crivello | 522/31 X |
| 4,154,872 | 5/1979 | Tsao et al. | 522/31 X |
| 4,173,476 | 11/1979 | Smith et al. | 522/31 X |

(List continued on next page.)

FOREIGN PATENT DOCUMENTS

| | | | |
|---|---|---|---|
| 0858648 | 12/1970 | Canada | 402/261 |
| 0893191 | 2/1972 | Canada | 402/267 |
| 0239784 | 10/1987 | European Pat. Off. . | |
| 2624981 | 12/1976 | Germany | B32B 27/38 |
| 0073794 | 6/1979 | Japan | 546/112 |
| 0127378 | 10/1981 | Japan | 546/112 |
| 58-138729 | 8/1983 | Japan | C08G 59/62 |
| 0963058 | 7/1964 | United Kingdom . | |
| 1174124 | 12/1969 | United Kingdom | 546/112 |
| 2099825A | 12/1982 | United Kingdom . | |
| 86/00627 | 1/1986 | WIPO . | |
| 8601216 | 2/1986 | WIPO | C08G 59/02 |

OTHER PUBLICATIONS

Swain et al. J. Am. Chem. Soc. 75, p. 141, 1953.
J. Org. Chem., vol. 49, pp. 1824–1825 (1984) by B. J. McBride, M. E. Garst and M. Hopkins.
"On the thermal behaviour of some alkylammonium tetrafluoroborates", Zabinska, Ferloni and Sanesi, Journ. Calorim., Anal. Therm. Thermodyn. Chim., vol. 17, pp. 250–253 (1986).
"Proposed Mechanism for the Curing of Epoxy Resins with Amine–Lewis Acid Complexes or Salts", J. J. Harris et al, J. Ap. Pol. Sc., vol. 10, pp. 523–534 (1966).
Akagane et al Shikizai Kyokaishi 1972 45(2) 69–74 Chemical Abstract vol. 77, 1972.
1972 Abstract 128180r, 1972.
Lewis, et al. JACS. vol. 43, 1921 pp. 2218–2223.
Hawley's Condensed Chemical Dictionary 11th Ed. (Van Nostrand Reinhold Co. New York) p. 529, 1982.
McBride et al., "Arylation of Dialkyl Sulfides", J. Org. Chem. 49, 1824–1825 (1984).
Derwent Abstract No. 74–69862V/40, 1974.
Derwent Abstract No. 82–07422J/50 (abstract for EP 0 066 543), 1982.
Derwent Abstract No. 81–50624D/28, 1981.

Primary Examiner—Yogendra N. Gupta

[57] ABSTRACT

A curable composition which comprises:

(1) a compound which contains on average more than 1 epoxy group per molecule;

(2) a compound which contains on average more than 1 phenolic hydroxyl group per molecule; and (3) a catalytic amount of a catalyst compound which contains:

(a) a cation containing at least one heterocyclic nitrogen-containing ring, and (b) an anion which is a conjugate base of fluoroarsenic acid, fluoroantimonic acid, fluorophosphoric acid, chloroarsenic acid, chloroantimonic acid, chlorophosphoric acid, nitric acid, hydrofluoric acid, trifluoroacetic acid, trifluoromethane sulfonic acid, picric acid, fluoboric acid, or an acid represented by the Formula:

$HBR_3R'$ wherein each R is independently a hydrocarbyl or substituted hydrocarbyl group and R' is a halogen, a hydrocarbonoxy group, a hydrocarbonamino group, or a hydrocarbonphosphino group.

16 Claims, No Drawings

U.S. PATENT DOCUMENTS

| | | | |
|---|---|---|---|
| 4,175,972 | 11/1979 | Crivello | 522/31 X18 |
| 4,273,668 | 6/1981 | Crivello | 522/31 X |
| 4,318,766 | 3/1982 | Smith | 522/31 X |
| 4,320,222 | 3/1982 | Lopez | 528/104 X |
| 4,322,456 | 3/1982 | Martin | 427/195 |
| 4,343,731 | 8/1982 | Pucci et al. | 523/427 |
| 4,358,578 | 11/1982 | Brownscombe | 528/91 |
| 4,366,295 | 12/1982 | Tyler, Jr. et al. | 525/482 |
| 4,393,185 | 7/1983 | Berner et al. | 528/27 |
| 4,410,596 | 10/1983 | Whiteside, Jr. et al. | 428/413 |
| 4,438,254 | 3/1984 | Doorakian et al. | 528/104 X |
| 4,440,914 | 4/1984 | Helfand et al. | 525/482 |
| 4,477,645 | 10/1984 | Doorakian et al. | 528/99 |
| 4,496,709 | 1/1985 | Doorakian et al. | 528/89 |
| 4,503,211 | 3/1985 | Robins | 528/92 |
| 4,540,823 | 9/1985 | Doorakian et al. | 568/10 |
| 4,544,732 | 10/1985 | Corley | 528/88 X |
| 4,554,342 | 11/1985 | Corley | 528/90 |
| 4,581,436 | 4/1986 | Corley | 528/88 X |
| 4,594,291 | 6/1986 | Bertram et al. | 528/97 X |
| 4,692,504 | 9/1987 | Frank | 502/164 X |
| 4,725,652 | 2/1988 | Bertram et al. | 528/91 X |
| 4,766,196 | 8/1988 | Goel et al. | 528/91 X |
| 4,775,734 | 10/1988 | Goel | 528/89 |

CURABLE COMPOSITION WHICH COMPRISES ADDUCTS OF HETEROCYCLIC COMPOUNDS

CROSSREFERENCE TO RELATED APPLICATIONS

This application is a division/continuation-in-part of application Ser. No. 07/894,416 filed June 5, 1992 (now abandoned), which is a division of application Ser. No. 555,350 filed Jul. 18, 1990 (now U.S. Pat. No. 5,134,239), which is a division of application serial no. 07/274,227 filed Nov. 18, 1988 (now abandoned), which is a continuation-in-part or application Ser. No. 155,381 filed Feb. 12, 1988 (now abandoned), which is a continuation-in-part of application Ser. No. 021,837 filed Mar. 4, 1987 (now U.S. Pat. No. 4,725,652), which is a continuation-in-part of application Ser. No. 849,087 filed Apr. 7, 1986 (now abandoned), which is a continuation-in-part of application Ser. No. 716,279 filed Mar. 25 1985, (now U.S. Pat. No. 4,594,291), which is a continuation-in-part of application Ser. No. 631,676, filed Jul. 17, 1984 (now abandoned); all of which are incorporated herein by reference.

FIELD OF THE INVENTION

The present invention concerns latent, curable, catalyzed mixtures of epoxy-containing compounds and aromatic hydroxyl-containing compounds. The present invention also concerns latent catalysts and epoxy resin compositions containing them.

BACKGROUND OF THE INVENTION

Epoxy resins have been precatalyzed with phosphonium and other compounds to provide latent compositions which form advanced, higher molecular weight epoxy resins when admixed with an aromatic hydroxyl-containing compound as disclosed by Perry in U.S. Pat. No. 3,948,855 and Can. 893,191; by Dante et al. in U.S. Pat. No. 3,477,9907 by Mueller et al. in U.S. Pat. No. 3,547,881; by Tyler, Jr. et al. in U.S. Pat. No. 4,366,2957 and by Cragar in Can. 858,648.

While compositions containing these catalysts and an epoxy resin are somewhat stable, such compositions which also contain an aromatic hydroxyl-containing compound are lacking in stability.

Curable compositions containing epoxy resins and aromatic hydroxyl-containing compounds and a catalyst therefor would be highly desirable in the preparation of storage stable coatings, storage stable electrical encapsulants, storage stable formulations for preparing mechanical and electrical laminates and composites, storage stable one package molding compositions, storage stable curable compositions for use in resin transfer molding (RTM) and reaction injection molding (RIM) applications and the like.

SUMMARY OF THE INVENTION

The present invention pertains to (A) the product resulting from contacting (1) at least one heterocyclic nitrogen, phosphorus, or sulfur-containing compound other than the compound pyridine with (2) an acid other than p-toluenesulfonic acid, said acid having a weak-nucleophilic anion; and (B) the product resulting from contacting (1) an adduct of at least one acid having a relatively strong nucleophilic anion and at least one heterocyclic nitrogen, phosphorus, or sulfur-containing compound other than the compound pyridine with (2) an acid or salt of an acid other than p-toluenesulfonic acid, said acid having a weak-nucleophilic anion wherein components (1) and (2) are contacted in quantities which provide from about 0.6 to about 1.4 equivalents of acid or acid salt contained in component (2) per nitrogen, phosphorus, or sulfur-containing heterocyclic ring contained in component (1).

Another aspect of the present invention pertains to an hydronium compound represented by the following formula $$Z^{\oplus a} X^{\ominus a}$$

wherein X is a weak nucleophilic anion other than the anion of p-toluenesulfonic acid; Z is a cation containing at least one heterocyclic nitrogen, phosphorus, or sulfur ring; and a has a value equal to the number of heterocyclic nitrogen, phosphorus, or sulfur-containing rings in Z.

The present invention also pertains to imidazolonium compounds represented by the following formula I

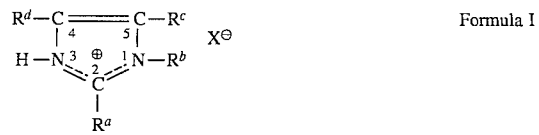

Formula I wherein each $R^a$, $R^b$, $R^c$ and $R^d$ are independently hydrogen or a hydrocarbyl group having from 1 to about 18 carbon atoms or such hydrocarbyl groups containing an oxygen, sulfur, cyano or halogen substituent, or $R^b$ and $R^c$ can combine to form a 5 or 6 membered ring with the carbon and nitrogen atoms from the imidazole ring to which they are attached or $R^c$ and $R^d$ can combine to form a 5 or 6 membered ring with the two carbon atoms from the imidazole ring to which they are attached; and X is the anion portion of an acid other than p-toluenesulfonic acid having a weak nucleophilic anion.

Further, the present invention pertains to morpholinonium compounds represented by the following formula II wherein each $R^a$, $R^b$, $R^c$, $R^d$, $R^e$, $R^f$, $R^g$, $R^h$ and $R^i$ is independently hydrogen, or a hydrocarbyl group having from 1 to about 18 carbon atoms or such hydrocarbyl groups containing an oxygen, sulfur, cyano or halogen or

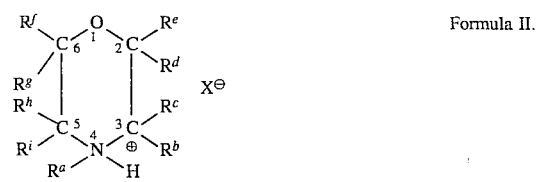

Formula II.

the like substituent; and X is the anion portion of an acid having a weak nucleophilic anion or a combination of such acids.

Further, the present invention pertains to pyrrolidinonium compounds represented by the following formula III

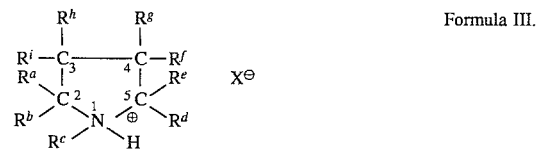

Formula III.

wherein each $R^a$, $R^b$, $R^c$, $R^d$, $R^e$, $R^f$, $R^g$, $R^h$ and $R^i$ is independently hydrogen, or a hydrocarbyl group having suitably from 1 to about 18, more suitably from 1 to about 9, carbon atoms or such hydrocarbyl groups containing an oxygen, sulfur, halogen or the like substituent with the proviso that at least one of $R^a$, $R^b$, $R^c$, $R^d$, $R^e$, $R^f$, $R^g$, $R^h$ or $R^i$ is a substitutent other than hydrogen when X is the $BF_4$ anion; and X is the anion portion of an acid having a weak nucleophilic anion.

Further, the present invention pertains to pyridinonium compounds represented by the following formula IV

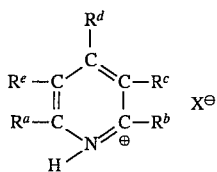

Formula IV.

wherein each $R^a$, $R^b$, $R^c$, $R^d$ and $R^e$ is independently hydrogen or a hydrocarbyl group having suitably from 1 to about 18, more suitably from 1 to about 9, carbon atoms or such hydrocarbyl groups containing an oxygen, sulfur, halogen or the like substituent; and X is the anion portion of an acid having a weak nucleophilic anion.

Further, the present invention pertains to pyrazolinonium compounds represented by the following formula V

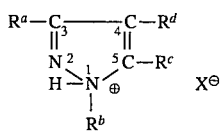

Formula V.

wherein each $R^a$, $R^b$, $R^c$ and $R^d$ is independently hydrogen or a hydrocarbyl group having suitably from 1 to about 18, more suitably from 1 to about 9, carbon atoms or such hydrocarbyl groups containing an oxygen, sulfur, cyano or halogen substituent, or $R^b$ and $R^c$ can combine to form a 5 or 6 membered ring with the carbon and nitrogen atoms from the pyrazole ring to which they are attached or $R^c$ and $R^d$ can combine to form a 5 or 6 membered ring with the two carbon atoms from the pyrazole ring to which they are attached; and X is the anion portion of an acid having a weak nucleophilic anion.

Further, the present invention pertains to oxazolinonium compounds represented by the following formula VI

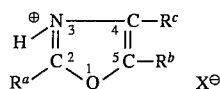

Formula VI.

wherein each $R^a$, $R^b$ and $R^c$ is independently hydrogen or a hydrocarbyl group having suitably from 1 to about 18, more suitably from 1 to about 9, carbon atoms or such hydrocarbyl groups containing an oxygen, sulfur, cyano or halogen or the like substituent; and X is the anion portion of an acid having a weak nucleophilic anion.

Further, the present invention pertains to imidazolidinonium compounds represented by the following formula VII

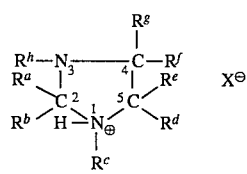

Formula VII.

wherein each $R^a$, $R^b$, $R^c$, $R^d$, $R^e$, $R^f$, $R^g$ and $R^h$ is independently hydrogen or a hydrocarbyl group having suitably from 1 to about 18, more suitably from 1 to about 9, carbon atoms or such hydrocarbyl groups containing an oxygen, sulfur, cyano or halogen or the like substituent; and X is the anion portion of an acid having a weak nucleophilic anion.

Further, the present invention pertains to imidazolinonium compounds represented by the following formula VIII

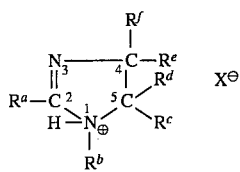

Formula VIII.

wherein each $R^a$, $R^b$, $R^c$, $R^d$, $R^e$ and $R^f$ is independently hydrogen or a hydrocarbyl group having suitably from 1 to about 18, more suitably from 1 to about 9, carbon atoms or such hydrocarbyl groups containing an oxygen, sulfur, cyano or halogen or the like substituent; and X is the anion portion of an acid having a weak nucleophilic anion.

Further, the present invention pertains to thiazolonium compounds represented by the following formula IX

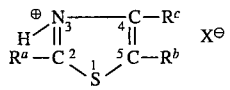

Formula IX.

wherein each $R^a$, $R^b$ and $R^c$ is independently hydrogen or a hydrocarbyl group having suitably from 1 to about 18, more suitably from 1 to about 9, carbon atoms or such hydrocarbyl groups containing an oxygen, sulfur, cyano or halogen or the like substituent; and X is the anion portion of an acid having a weak nucleophilic anion.

Further, the present invention pertains to pyrrolonium compounds represented by the following formula X

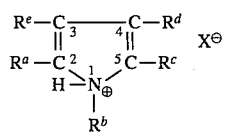

Formula X.

wherein each $R^a$, $R^b$, $R^c$, $R^d$ and $R^e$ is independently hydrogen or a hydrocarbyl group having suitably from 1 to about 18, more suitably from 1 to about 9, carbon atoms or such hydrocarbyl groups containing an oxygen, sulfur, cyano or halogen or the like substituent; and X is the anion portion of an acid having a weak nucleophilic anion.

Further, the present invention pertains to pyrazinonium compounds represented by the following formula XI

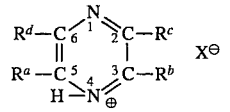

Formula XI.

wherein each $R^a$, $R^b$, $R^c$ and $R^d$ is independently hydrogen, or a hydrocarbyl group having suitably from 1 to about 18, more suitably from 1 to about 9, carbon atoms or such hydrocarbyl groups containing an oxygen, sulfur, cyano or halogen or the like substituent; and X is the anion portion of an acid having a weak nucleophilic anion.

Further, the present invention pertains to pyridazinonium compounds represented by the following formula XII

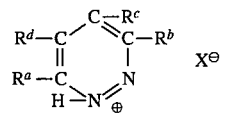

Formula XII.

wherein each $R^a$, $R^b$, $R^c$, and $R^d$ is independently hydrogen, hydrogen or a hydrocarbyl group having suitably from 1 to about 18, more suitably from 1 to about 9, carbon atoms or such hydrocarbyl groups containing an oxygen, sulfur, cyano or halogen or the like substituent; and X is the anion portion of an acid having a weak nucleophilic anion.

Further, the present invention pertains to pyrimidinonium compounds represented by the following formula XIII

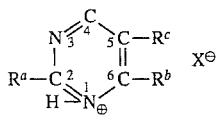
Formula XIII.

wherein each $R^a$, $R^b$ and $R^c$ is independently hydrogen, or a hydrocarbyl group having suitably from 1 to about 18, more suitably from 1 to about 9, carbon atoms or such hydrocarbyl groups containing an oxygen, sulfur, cyano or halogen or the like substituent; and X is the anion portion of an acid having a weak nucleophilic anion.

Further, the present invention pertains to quinoxalinonium compounds represented by the following formula XIV

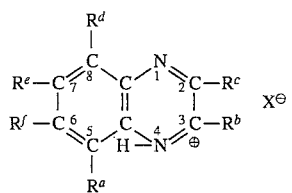
Formula XIV.

wherein each $R^a$, $R^b$, $R^c$, $R^d$, $R^e$, and $R^f$ is independently hydrogen, or a hydrocarbyl group having suitably from 1 to about 18, more suitably from 1 to about 9, carbon atoms or such hydrocarbyl groups containing an oxygen, sulfur, cyano or halogen substituent; and X is the anion portion of an acid having a weak nucleophilic anion.

Further, the present invention pertains to quinazolinonium compounds represented by the following formula XV

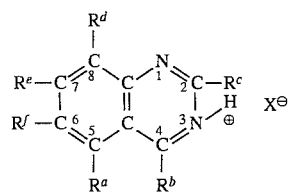
Formula XV.

wherein each $R^a$, $R^b$, $R^c$, $R^d$, $R^e$, and $R^f$ is independently hydrogen, or a hydrocarbyl group having suitably from 1 to about 18, more suitably from 1 to about 9, carbon atoms or such hydrocarbyl groups containing an oxygen, sulfur, cyano or halogen or the like substituent; and X is the anion portion of an acid having a weak nucleophilic anion.

Further, the present invention pertains to phthalazinonium compounds represented by the following formula XVI

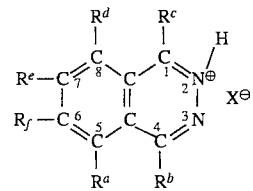
Formula XVI.

wherein each $R^a$, $R^b$, $R^c$, $R^d$, $R^e$, and $R^f$ is independently hydrogen, or a hydrocarbyl group having suitably from 1 to about 18, more suitably from 1 to about 9, carbon atoms or such hydrocarbyl groups containing an oxygen, sulfur, cyano or halogen or the like substituent; and X is the anion portion of an acid having a weak nucleophilic anion.

Further, the present invention pertains to quinolinonium compounds represented by the following formula XVII

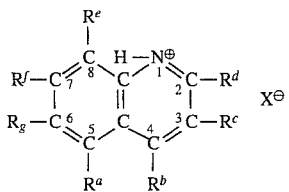
Formula XVII.

wherein each $R^a$, $R^b$, $R^c$, $R^d$, $R^e$, $R^f$ and $R^g$ is independently hydrogen, or a hydrocarbyl group having suitably from 1 to about 18, more suitably from 1 to about 9, carbon atoms or such hydrocarbyl groups containing an oxygen, sulfur, cyano or halogen or the like substituent; and X is the anion portion of an acid having a weak nucleophilic anion.

Further, the present invention pertains to purinonium compounds represented by the following formula XVIII

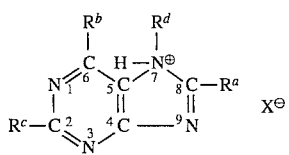
Formula XVIII.

wherein each $R^a$, $R^b$, $R^c$ and $R^d$ is independently hydrogen, or a hydrocarbyl group having suitably from 1 to about 18, more suitably from 1 to about 9, carbon atoms or such hydrocarbyl groups containing an oxygen, sulfur, cyano or halogen or the like substituent; and X is the anion portion of an acid having a weak nucleophilic anion.

Further, the present invention pertains to indazolonium compounds represented by the following formula XIX

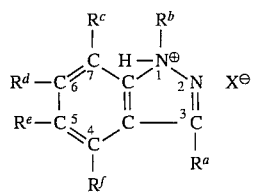
Formula XIX.

wherein each $R^a$, $R^b$, $R^c$, $R^d$, $R^e$ and $R^f$ is independently hydrogen, or a hydrocarbyl group having suitably from 1 to about 18, more suitably from 1 to about 9, carbon atoms or such hydrocarbyl groups containing an oxygen, sulfur, cyano or halogen or the like substituent; and X is the anion portion of an acid having a weak nucleophilic anion.

Further, the present invention pertains to indolonium compounds represented by the following formula XX

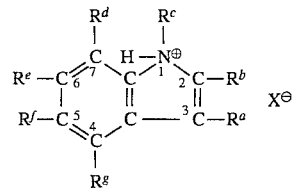
Formula XX.

wherein each $R^a$, $R^b$, $R^c$, $R^d$, $R^e$, $R^f$ and $R^g$ is independently hydrogen, or a hydrocarbyl group having suitably from 1 to about 18, more suitably from 1 to about 9, carbon atoms or such hydrocarbyl groups containing an oxygen, sulfur, cyano or halogen or the like substituent; and X is the anion portion of an acid having a weak nucleophilic anion.

Further, the present invention pertains to indolizinonium compounds represented by the following formula XXI

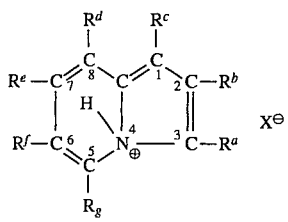

Formula XXI.

wherein each $R^a$, $R^b$, $R^c$, $R^d$, $R^e$, $R^f$ and $R^g$ is independently hydrogen, or a hydrocarbyl group having suitably from 1 to about 18, more suitably from 1 to about 9, carbon atoms or such hydrocarbyl groups containing an oxygen, sulfur, cyano or halogen or the like substituent; and X is the anion portion of an acid having a weak nucleophilic anion.

Further, the present invention pertains to phenazinonium compounds represented by the following formula XXII

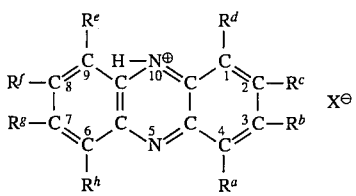

Formula XXII.

wherein each $R^a$, $R^b$, $R^c$, $R^d$, $R^e$, $R^f$, $R^g$ and $R^h$ is independently hydrogen, or a hydrocarbyl group having suitably from 1 to about 18, more suitably from 1 to about 9, carbon atoms or such hydrocarbyl groups containing an oxygen, sulfur, cyano or halogen or the like substituent; and X is the anion portion of an acid having a weak nucleophilic anion.

Further, the present invention pertains to phenarsazinonium compounds represented by the following formula XXIII

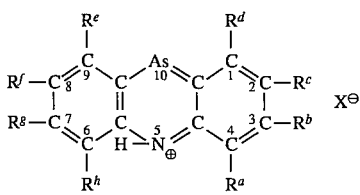

Formula XXIII.

wherein each $R^a$, $R^b$, $R^c$, $R^d$, $R^e$, $R^f$, $R^g$ and $R^h$ is independently hydrogen, or a hydrocarbyl group having suitably from 1 to about 18, more suitably from 1 to about 9, carbon atoms or such hydrocarbyl groups containing an oxygen, sulfur, cyano or halogen or the like substituent; and X is the anion portion of an acid having a weak nucleophilic anion.

Further, the present invention pertains to phenothiazinonium compounds represented by the following formula XXIV

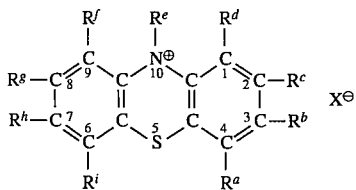

Formula XXIV.

wherein each $R^a$, $R^b$, $R^c$, $R^d$, $R^e$, $R^f$, $R^g$, $R^h$ and $R^i$ is independently hydrogen, or a hydrocarbyl group having suitably from 1 to about 18, more suitably from 1 to about 9, carbon atoms or such hydrocarbyl groups containing an oxygen, sulfur, cyano or halogen or the like substituent; and X is the anion portion of an acid having a weak nucleophilic anion.

Further, the present invention pertains to pyrrolinonium compounds represented by the following formula XXV

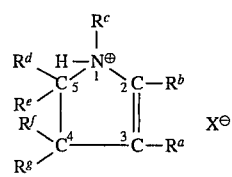

Formula XXV.

wherein each $R^a$, $R^b$, $R^c$, $R^d$, $R^e$, $R^f$ and $R^g$ is independently hydrogen, or a hydrocarbyl group having suitably from 1 to about 18, more suitably from 1 to about 9, carbon atoms or such hydrocarbyl groups containing an oxygen, sulfur, cyano or halogen or the like substituent; and X is the anion portion of an acid having a weak nucleophilic anion.

Further, the present invention pertains to indolinonium compounds represented by the following formula XVI

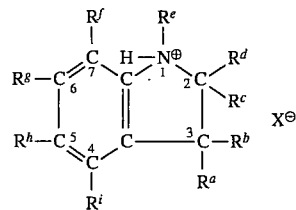

Formula XXVI.

wherein each $R^a$, $R^b$, $R^c$, $R^d$, $R^e$, $R^f$, $R^g$, $R^h$ and $R^i$ is independently hydrogen, or a hydrocarbyl group having suitably from 1 to about 18, more suitably from 1 to about 9, carbon atoms or such hydrocarbyl groups containing an oxygen, sulfur, cyano or halogen or the like substituent; and X is the anion portion of an acid having a weak nucleophilic anion.

Further, the present invention pertains to piperidinonium compounds represented by the following formula XVII

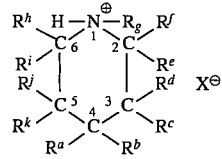

Formula XXVII.

wherein each $R^a$, $R^b$, $R^c$, $R^d$, $R^e$, $R^f$, $R^g$, $R^h$, $R^i$, $R^j$ and $R^k$ is independently hydrogen, or a hydrocarbyl group having suitably from 1 to about 18, more suitably from 1 to about 9, carbon atoms or such hydrocarbyl groups containing an oxygen, sulfur, cyano or halogen or the like substituent; and X is the anion portion of an acid having a weak nucleophilic anion.

Further, the present invention pertains to piperazinonium compounds represented by the following formula XXVIII

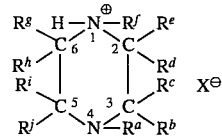

Formula XXVIII.

wherein each $R^a$, $R^b$, $R^c$, $R^d$, $R^e$, $R^f$, $R^g$, Rh, $R^i$ and $R^j$ is independently hydrogen, or a hydrocarbyl group having suitably from 1 to about 18, more suitably from 1 to about 9, carbon atoms or such hydrocarbyl groups containing an oxygen, sulfur, cyano or halogen or the like substituent; and X is the anion portion of an acid having a weak nucleophilic anion.

The term hydrocarbyl as employed herein refers to a monovalent aliphatic hydrocarbon group such as alkyl, cycloalkyl, alkenyl and similar hydrocarbon groups.

The term weak-nucleophilic as employed herein means that the material has a nucleophilicity value "n" from greater than zero to less than about 2.5, preferably from about 0.5 to about 2, more preferably from about 1 to about 2 as described by C. G. Swain and C. B. Scott in *J. Am. Chem. Soc.*, Vol. 75, p. 141 (1953) which is incorporated herein by reference.

The term relatively strong-nucleophilic as employed herein means that the material has a nucleophilicity value "n" of 2.5 or greater as described by C. G. Swain and C. B. Scott in *J. Am. Chem. Soc.*, Vol. 75, p. 141 (1953) which is incorporated herein by reference.

The present invention may suitably comprise, consist of, or consist essentially oft all or only a portion of the aforementioned components. The components can be eliminated singly or in multiples of any two or more from those components enumerated above.

The invention illustratively disclosed herein suitably can also be practiced in the absence of any component which is not specifically disclosed or enumerated herein.

DETAILED DESCRIPTION OF THE INVENTION

Any numerical values recited herein include all values from the lower value to the upper value in increments of one unit provided that there is a spearation of at least 2 units between any lower value and any higher value. As an example, if it is stated that the amount of a component is, for example, from 1 to 90, preferably 20 to 80, more preferably from 30 to 70, it is intended that values such as 15–85, 22–68, 43– 51, 30–32 etc. are expressly enumerated in this specification. Usually, for values which are less than one, one unit is considered to be 0.1; therefore, the minimum separation between any lower value and any higher value is 0.2. These are only examples of what is specifically intended and all possible combinations of numerical values between the lowest value and the highest value enumerated are to be considered to be expressly stated in this application in a similar manner.

The latent catalysts of the present invention are prepared by simply mixing the hydronium, amine nitrogen, phosphorus, or sulfur-containing heterocyclic compound with the acid having a weak-nucleophilic anion in the desired proportions and stirring to insure intimate contact. The contact can be conducted at temperatures of from about 0° C. to about 100° C., preferably from about 20° C. to about 60° C. for a time sufficient to complete any reaction which occurs. The time depends upon the temperature, but usually from about 1 to about 120, preferably from about 5 to about 60 minutes is sufficient.

The components from which the catalysts are prepared are mixed in proportions which provide from about 0.6 to about 1.4, suitably from about 0.75 to about 1.3, more suitably from about 0.85 to about 1.2, most suitably from about 0.95 to about 1.1, equivalents of acid per nitrogen, phosphorus, or sulfur-containing heterocyclic ring. When the amount of acid is less than about 0.6 equivalent per nitrogen-containing heterocyclic ring contained in imidazole, the catalyst is less latent and begins to approach the reactivity of the original imidazole prior to reaction with the acid. When the amount of acid is more than about 1.4 equivalents per nitrogen-containing heterocyclic ring contained in imidazole, the catalyst becomes less latent to the point that at a ratio of about 1.5:1 the catalyst becomes an accelerator as compared to the original hydronium, amine, nitrogen, phosphorus, or sulfur-containing compound prior to reaction with the acid.

The latent catalysts of the present invention are useful to catalyze the reaction between vicinal epoxide-containing compounds and phenolic hydroxyl-containing compounds.

The catalysts can be employed in amounts sufficient to catalyze the reaction between the vicinal epoxide-containing compounds and the phenolic hydroxyl-containing compounds when heated to a temperature of at least about 100° C. In most instances, the quantity of catalyst is from about 0.05 to about 50, suitably from about 0.1 to about 30, more suitably from about 0.5 to about 20, most suitably from about 1 to about 10 millimoles of catalyst per epoxide equivalent.

The heterocyclic secondary and tertiary amines, nitrogen, phosphorus, or sulfur-containing compounds which can be employed herein can contain one, two or three or more nitrogen, phosphorus, or sulfur atoms per molecule Suitable heterocyclic secondary and tertiary amines, nitrogen, phosphorus, or sulfur-containing compounds which can be employed herein include, for example, imidazoles, imidazolidines, imidazolines, oxazoles, pyrroles, thiazoles, pyridines, pyrazines, morpholines, pyridazine, pyrimidine, pyrrolidines, pyrazoles, quinoxalines, quinazolines, phthalozines, quinolines, purines, indazoles, indoles, indolazines, phenazines, phenarsines, phenothiazines, pyrrolines, indolines, piperidines, piperazines, thiophenes, benzothiophenes (thionophthenes), naphthothiophenes, thianthrenes, phenoxathiins, thienofurans, imidazothiazoles, dithiatetrahydronaphthalenes, dithioles, oxathioles, thiazoles, oxathiazoles, oxathiazines, thiepins, or any combination thereof and the like.

Suitable imidazole compounds which can be employed herein include, for example, those represented by the following formula A

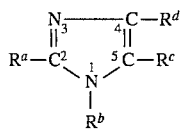

Formula A.

wherein each $R^a$, $R^b$, $R^c$ and $R^d$ is independently hydrogen or a hydrocarbyl group having suitably from 1 to about 18, more suitably from 1 to about 9, carbon atoms or such hydrocarbyl groups containing an oxygen, sulfur, cyano or halogen substituent, or $R^b$ and $R^c$ can combine to form a 5 or 6 membered ring with the carbon and nitrogen atoms from the imidazole ring to which they are attached or $R^c$ and $R^d$ can combine to form a 5 or 6 membered ring with the two carbon atoms from the imidazole ring to which they are attached. Particularly suitable imidazole compounds include, for example, 2-methylimidazole, 2-ethylimidazole, 2-propylimidazole, 2-butylimidazole, 2-pentylimidazole, 2-hexylimidazole, 2-cyclohexylimidazole, 2-phenyl-imidazole, 2-nonylimidazole, 2-undecylimidazole, 2-heptadecylimidazole, 2-ethyl-4-methylimidazole, 2-phenyl-4-methylimidazole, 1-benzylimidazole, 1-ethyl-2-methylbenzimidazole, 2-methyl-5,6-benzimidazole, 1-vinylimidazole, 1-allyl-2-methylimidazole, or any combination thereof and the like. Suitable imidazoles wherein one or more of the $R^a$, $R^b$, $R^c$, or $R^d$ group contain oxygen, sulfur, cyano or halogen substituents include, for example, 1-(2-hydroxypropyl)-2-methylimidazole, 2-phenyl-4,5-dimethylolimidazole, 2-phenyl-4-methyl-5-hydroxymethylimidazole, 2-chloromethylbenzimidazole, 2-hydroxybenzimidazole, or any combination thereof and the like. Most particularly suitable are 2-methylimidazole, 2-ethyl-4-methylimidazole, 1,2-dimethylimidazole and 2-phenylimidazole.

Suitable pyrazole compounds which can be employed herein include, for example, those represented by the following formula B

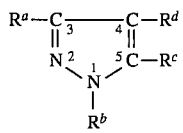

Formula B.

wherein each $R^a$, $R^b$, $R^c$ and $R^d$ is independently hydrogen or a hydrocarbyl group having suitably from 1 to about 18, more suitably from 1 to about 9, carbon atoms or such hydrocarbyl groups containing an oxygen, sulfur, cyano or halogen substituent, or $R^b$ and $R^c$ can combine to form a 5 or 6 membered ring with the carbon and nitrogen atoms from the pyrazole ring to which they are attached or $R^c$ and $R^d$ can combine to form a 5 or 6 membered ring with the two carbon atoms from the pyrazole ring to which they are attached. Particle suitable pyrazole compounds include, for example, pyrazole, 1-methylpyrazole, 3-methylpyrazole, 4-butylpyrazole, 1-methyl-3-propylpyrazole, 3-ethyl-5-methylpyrazole, 1-(3-hydroxypropyl)pyrazole, 5-phenylpyrazole, 5-benzylpyrazole, 1-phenyl-3-methylpyrazole, 1-cyanopyrazole, 3-chloropyrazole, 4-bromo-1-methyl-pyrazole, or any combination thereof and the like.

Suitable oxazole compounds which can be employed herein include, for example, those represented by the following formula C

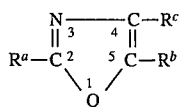

Formula C.

wherein each $R^a$, $R^b$ and $R^c$ is independently hydrogen or a hydrocarbyl group having suitably from 1 to about 18, more suitably from 1 to about 9, carbon atoms or such hydrocarbyl groups containing an oxygen, sulfur, cyano or halogen or the like substituent. Particularly suitable oxazole compounds include, for example, oxazole, 3-methyloxazole, 2-methyloxazole, 4-butyloxazole, 3-methyl-5-propyloxazole, 2-ethyl-4-methyloxazole, 3-(3-hydroxypropyl)oxazole, 4-phenyloxazole, 3-benzyloxazole, 2-phenyl-3-methyloxazole, 2-cyanooxazole, 4-chlorooxazole, 4-bromo-3-methyloxazole, or any combination thereof and the like.

Suitable imidazolidine compounds which can be employed herein include, for example, those represented by the following formula D

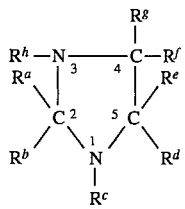

Formula D.

wherein each $R^a$, $R^b$, $R^c$, $R^d$, $R^e$, $R^f$, $R^g$ and $R^h$ is independently hydrogen or a hydrocarbyl group having suitably from 1 to about 18, more suitably from 1 to about 9, carbon atoms or such hydrocarbyl groups containing an oxygen, sulfur, cyano or the like or halogen substituent. Particularly suitable imidazolidine compounds include, for example, imidazolidine, 1-methylimidazolidine, 2-methylimidazolidine, 4-butylimidazolidine, 1-methyl-3-propylimidazolidine, 1-ethyl-4-methyl-imidazolidine, 1-(3-hydroxypropyl)imidazolidine, 2-phenylimidazolidine, 1-benzylimidazolidine, 2-phenyl-1-methylimidazolidine, 4-cyanoimidazolidine, 4-chloroimidazolidine, 4-bromo-1-methylimidazolidine, or any combination thereof and the like.

Suitable imidazoline compounds which can be employed herein include, for example, those represented by the following formula E

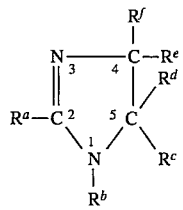

Formula E.

wherein each $R^a$, $R^b$, $R^c$, $R^d$, $R^e$ and $R^f$ is independently hydrogen or a hydrocarbyl group having suitably from 1 to about 18, more suitably from 1 to about 9, carbon atoms or such hydrocarbyl groups containing an oxygen, sulfur, cyano or halogen or the like substituent. Particularly suitable imidazoline compounds include, for example, imidazoline, 1-methylimidazolidine, 2-methylimidazolidine, 4-butylimidazolidine, 1-methyl-2-propylimidazolidine, 1-ethyl-4-methylimidazolidine, 1-(3-hydroxypropyl)imidazolidine, 2-phenylimidazolidine, 1-benzylimidazolidine, 2-phenyl-1-methylimidazolidine, 4-cyanoimidazolidine, 5-chloroimidazolidine, 5-bromo-1-methylimidazolidine, or any combination thereof and the like.

Suitable thiazole compounds which can be employed herein include, for example, those represented by the following formula F

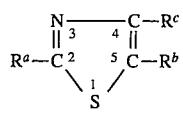

Formula F.

wherein each $R^a$, $R^b$ and $R^c$ is independently hydrogen or hydrocarbyl group having suitably from 1 to about 18, more suitably from 1 to about 9, carbon atoms or such hydrocarbyl groups containing an oxygen, sulfur, cyano or halogen or the like substituent. Particularly suitable thiazole compounds include, for example, thiazole, 2-methylthiazole, 3-methylthiazole, 4-butylthiazole, 2-methyl-3-propylthiazole, 3-ethyl-5-methylthiazole, 3-(3-hydroxypropyl)thiazole, 2-phenylthiazole, 3-benzylthiazole, 4-phenyl-3-methylthiazole, 2-cyanothiazole, 5-chlorothiazole, 5-bromo-3-methylthiazole, or any combination thereof and the like.

Suitable pyrrole compounds which can be employed herein include, for example, those represented by the following formula G

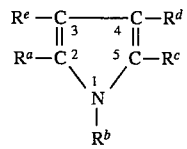

Formula G.

wherein each $R^a$, $R^b$, $R^c$, $R^d$ and $R^e$ is independently hydrogen or a hydrocarbyl group having suitably from 1 to about 18, more suitably from 1 to about 9, carbon atoms or such hydrocarbyl groups containing an oxygen, sulfur, cyano or halogen or the like substituent. Particularly suitable pyrrole compounds include, for example, pyrrole, 1-methylpyrrole, 2-methylpyrrole, 3-butylpyrrole, 1-methyl-2-propylpyrrole, 2-ethyl-3-methylpyrrole, 1-(3-hydroxypropyl)pyrrole, 2-phenylpyrrole, 1-benzylpyrrole, 2-phenyl-1-methylpyrrole, 3-cyanopyrrole, 3-chloropyrrole, 2-bromo-1-methylpyrrole, or any combination thereof and the like.

Suitable pyridine compounds which can be employed herein include, for example, those represented by the following formula H

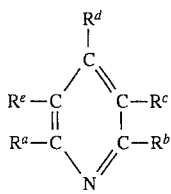

Formula H.

wherein each $R^a$, $R^b$, $R^c$, $R^d$ and $R^e$ is independently hydrogen or a hydrocarbyl group having suitably from 1 to about 18, more suitably from 1 to about 9, carbon atoms or such hydrocarbyl groups containing an oxygen, sulfur, cyano or halogen or the like substituent with the proviso that at least one of the $R^a$, $R^b$, $R^c$, $R^d$ or $R^e$ groups is other than hydrogen. Particularly suitable pyridine compounds include, for example, 2-methylpyridine, 3-methylpyridine, 4-butylpyridine, 2-methyl-3-propylpyridine, 3-ethyl-4-methylpyridine, 4-(3-hydroxypropyl)pyridine, 2-phenylpyridine, 3-benzylpyridine, 4-phenyl-2-methylpyridine, 3-cyanopyridine, 2-chloropyridine, 3-bromo-5-methylpyridine, combinations thereof and the like.

Suitable pyrazine compounds which can be employed herein include, for example, those represented by the following Formula I

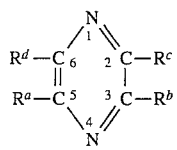

Formula I.

wherein each $R^a$, $R^b$, $R^c$ and $R^d$ is independently hydrogen, or a hydrocarbyl group having suitably from 1 to about 18, more suitably from 1 to about 9, carbon atoms or such hydrocarbyl groups containing an oxygen, sulfur, cyano or halogen or the like substituent. Particularly suitable pyrazine compounds include, for example, pyrazine, 2-methylpyrazine, 3-methylpyrazine, 2-butylpyrazine, 2-methyl-5-propyl-pyrazine, 2-ethyl-6-methylpyrazine, 2-(3-hydroxy-propyl)pyrazine, 2-phenylpyrazine, 2-benzylpyrazine, 2-phenyl-3-methylpyrazine, 2-cyanopyrazine, 2-chloropyrazine, 2-bromo-5-methylpyrazine, or any combination thereof and the like.

Suitable pyridazine compounds which can be employed herein include, for example, those represented by the following formula J

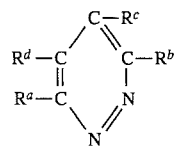

Formula J.

wherein each $R^a$, $R^b$, $R^c$, and $R^d$ is independently hydrogen or a hydrocarbyl group having suitably from 1 to about 18, more suitably from 1 to about 9, carbon atoms or such hydrocarbyl groups containing an oxygen, sulfur, cyano or halogen or the like substituent. Particularly suitable pyridazine compounds include, for example, pyridazine, 3-methylpyridazine, 4-methylpyridazine, 3-butylpyridazine, 3-methyl-4-propylpyridazine, 3-ethyl-6-methylpyridazine, 4-(3-hydroxypropyl)-pyridazine, 3-phenylpyridazine, 4-benzylpyridazine, 4-phenyl-5-methylpyridazine, 4-cyanopyridazine, 4-chloropyridazine, 3-bromo-5-methylpyridazine, or any combination thereof and the like.

Suitable pyrrolidine compounds which can be employed herein include, for example, those represented by the following formula K

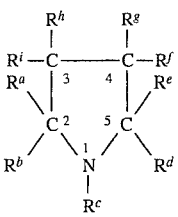

Formula K.

wherein each $R^a$, $R^b$, $R^c$, $R^d$, $R^e$, $R^f$, $R^g$, $R^h$ and $R^i$ is independently hydrogen, or a hydrocarbyl group having suitably from 1 to about 18, more suitably from 1 to about 9, carbon atoms or such hydrocarbyl groups containing an oxygen, sulfur, cyano or halogen or the like substituent. Particularly suitable pyrrolidine compounds include, for example, pyrrolidine, 1-methylpyrrolidine,, 4-phenylpyrrolidine, 2-methylpyrrolidine, 3-methylpyrrolidine, 1-butylpyrrolidine, 1-methyl-2-propylpyrrolidine, 3-ethyl-4-methylpyrrolidine, 2-(3-hydroxypropyl)pyrrolidine, 1-phenyl-2-methylpyrrolidine, 2-cyanopyrrolidine, 2-chloropyrrolidine, 2-bromo-1-methylpyrrolidine, or any combination thereof and the like.

Suitable morpholine compounds which can be employed herein include, for example, those represented by the following formula L

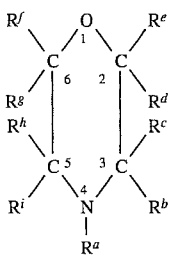

Formula L.

wherein is hydrogen, a hydrocarbyl group having suitably from 2 to about 18, more suitably from 2 to about 9, carbon atoms or such hydrocarbyl groups containing an oxygen, sulfur, halogen or the like substituent; each $R^a$, $R^b$, $R^c$, $R^d$, $R^e$, $R^f$, $R^g$, $R^h$ and $R^i$ is independently hydrogen or a hydrocarbyl group having suitably from 1 to about 18, more suitably from 1 to about 9, carbon atoms or such hydrocarbyl groups containing an oxygen, sulfur, halogen or the like substituent. Particularly suitable morpholine compounds include, for example, morpholine, 4-methylmorpholine, 3-methylmorpholine, 4-butyl-morpholine, 4-methyl-3-propylmorpholine, 2-ethyl-3-methylmorpholine, 4-(3-hydroxypropyl)morpholine, 2-phenylmorpholine, 4-benzylmorpholine, 3-phenyl-1-methylmorpholine, 3-cyanomorpholine, 3-chloromorpholine, 3-bromo-4-methylmorpholine, combinations thereof and the like.

Suitable pyrimidine compounds which can be employed herein include, for example, those represented by the following formula M

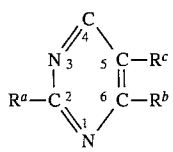

Formula M.

wherein each $R^a$, $R^b$ and $R^e$ is independently hydrogen, or a hydrocarbyl group having suitably from 1 to about 18, more suitably from 1 to about 9, carbon atoms or such hydrocarbyl groups containing an oxygen, sulfur, cyano or halogen or the like substituent. Particularly suitable pyrimidine compounds which can be employed herein include, for example, pyrimidine, 2-methylpyrimidine, 4-methyl-pyrimidine, 2-butylpyrimidine, 2-methyl-4-propyl-pyrimidine, 4-ethyl-5-methylpyrimidine, 2-(3-hydroxypropyl)pyrimidine, 2-phenylpyrimidine, 2-benzylpyrimidine, 4-phenyl-2-methylpyrimidine, 4-cyanopyrimidine, 2-chloropyrimidine, 4-bromo-2-methylpyrimidine, or any combination thereof and the like.

Suitable quinoxaline compounds which can be employed herein include, for example, those represented by the following formula N

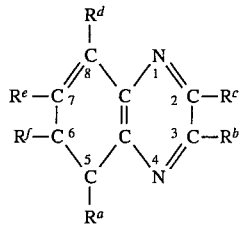

Formula N.

wherein each $R^a$, $R^b$, $R^c$, $R^d$, $R^e$, and $R^f$ is independently hydrogen, or a hydrocarbyl group having suitably from 1 to about 18, more suitably from 1 to about 9, carbon atoms or such hydrocarbyl groups containing an oxygen, sulfur, cyano or halogen substituent. Particularly suitable quinoxaline compounds include, for example, quinoxaline, 2-methylquinoxaline, 5-methylquinoxaline, 2-butylquinoxaline, 2-methyl-3-propylquinoxaline, 5-ethyl-6-methylquinoxaline, 2-(3-hydroxypropyl)quinoxaline, 2-phenylquinoxaline, 5-benzylquinoxaline, 2-phenyl-5-methylquinoxaline, 2-cyanoquinoxaline, 2-chloroquinoxaline, 2-bromo-5-methylquinoxaline, or any combination thereof and the like.

Suitable quinazoline compounds which can be employed herein include, for example, those represented by the following formula O

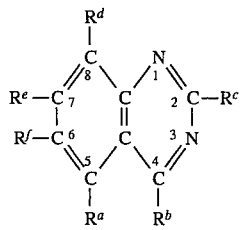

Formula O.

wherein each $R^a$, $R^b$, $R^c$, $R^d$, $R^e$, and $R^f$ is independently hydrogen, or a hydrocarbyl group having suitably from 1 to about 18, more suitably from 1 to about 9, carbon atoms or such hydrocarbyl groups containing an oxygen, sulfur, cyano or halogen substituent. Suitable quinazoline compounds include, for example, quinazoline, 2-methylquinazoline, 4-methylquinazoline, 2-butylquinazoline, 2-methyl-4-propylquinazoline, 5-ethyl-6-methyl-quinazoline, 2-(3-hydroxypropyl)quinazoline, 2-phenylquinazoline, 2-benzylquinazoline, 2-phenyl-4-methylquinazoline, 4-cyanoquinazoline, 4-chloroquinazoline, 2-bromo-4-methylquinazoline, or any combination thereof and the like.

Suitable phthalazine compounds which can be employed herein include, for example, those represented by the following formula P

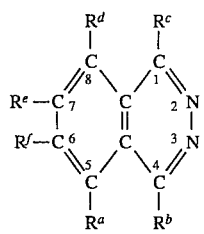

Formula P.

wherein each $R^a$, $R^b$, $R^c$, $R^d$, $R^e$, and $R^f$ is independently hydrogen, or a hydrocarbyl group having suitably from to about 18, more suitably from 1 to about 9, carbon atoms or such hydrocarbyl groups containing an oxygen, sulfur, cyano or halogen or the like substituent. Suitable phthalazine compounds include, for example, phthalazine, 1-methylphthalazine, 6-methylphthalazine, 1-butylphthalazine, 1-methyl-4-propylphthalazine, 1-ethyl-6-methyl-phthalazine, 1-(3-hydroxypropyl)phthalazine, 5-phenylphthalazine, 1-benzylphthalazine, 1-phenyl-4-methylphthalazine, 1-cyanophthalazine, 1-chlorophthalazine, 1-bromo-4-methylphthalazine, or any combination thereof and the like.

Suitable quinoline compounds which can be employed herein include, for example, those represented by the following formula Q

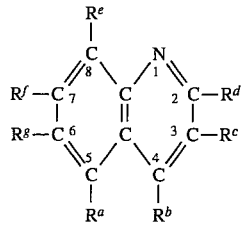

Formula Q.

wherein each $R^a$, $R^b$, $R^c$, $R^d$, $R^e$, $R^f$ and $R^g$ is independently hydrogen, or a hydrocarbyl group having suitably from 1 to about 18, more suitably from 1 to about 9, carbon atoms or such hydrocarbyl groups containing an oxygen, sulfur, cyano or halogen or the like substituent. Suitable quinoline compounds which can be employed herein include, for example, quinoline, 2-methylquinoline, 3-methylquinoline, 4-butylquinoline, 5-methyl-2-propylquinoline, 2-ethyl-3-methylquinoline, 3-(3-hydroxypropyl)quinoline, 3-phenylquinoline, 4-benzylquinoline, 3-phenyl-2-methylquinoline, 3-cyanoquinoline, 4-chloroquinoline, 2-bromo-3-methylquinoline, or any combination thereof and the like.

Suitable purine compounds which can be employed herein include, for example, those represented by the following formula R

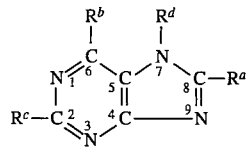

Formula R.

wherein each $R^a$, $R^b$, $R^c$ and $R^d$ is independently hydrogen, or a hydrocarbyl group having suitably from 1 to about 18, more suitably from 1 to about 9, carbon atoms or such hydrocarbyl groups containing an oxygen, sulfur, cyano or halogen or the like substituent. Suitable purine compounds include, for example, purine, 2-methylpurine, 8-methylpurine, 6-butylpurine, 2-methyl-8-propylpurine, 6-ethyl-8-methylpurine, 8-(3-hydroxypropyl)purine, 2-phenylpurine, 2-benzylpurine, 6-phenyl-2-methyl-purine, 8-cyanopurine, 2-chloropurine, 8-bromo-2-methylpurine, or any combination thereof and the like.

Suitable indazole compounds which can be employed herein include, for example, those represented by the following formula S

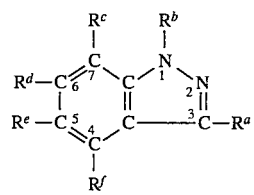

Formula S.

wherein each $R^a$, $R^b$, $R^c$, $R^d$, $R^e$ and $R^f$ is independently hydrogen, or a hydrocarbyl group having suitably from 1 to about 18, more suitably from 1 to about 9, carbon atoms or such hydrocarbyl groups containing an oxygen, sulfur, cyano or halogen or the like substituent. Suitable indazole compounds include, for example, indazole, 1-methylindazole, 3-methylindazole, 1-butylindazole, 1-methyl-3-propylindazole, 1-ethyl-5-methylindazole, 3-(3-hydroxypropyl)indazole, 3-phenylindazole, 6-benzylindazole, 6-phenyl-1-methylindazole, 3-cyanoindazole, 5-chloroindazole, 3-bromo-1-methylindazole, or any combination thereof and the like.

Suitable indole compounds which can be employed herein include, for example, those represented by the following formula T

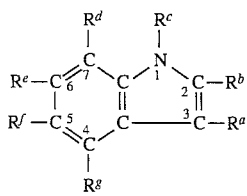

Formula T.

wherein each $R^a$, $R^b$, $R^c$, $R^d$, $R^e$, $R^f$ and $R^g$ is independently hydrogen, or a hydrocarbyl group having suitably from 1 to about 18, more suitably from 1 to about 9, carbon atoms or such hydrocarbyl groups containing an oxygen, sulfur, cyano or halogen or the like substituent. Suitable indole compounds which can be employed herein include, for example, indole, 1-methylindole, 2-methylindole, 3-butylindole, 1-methyl-2-propylindole, 2-ethyl-3-methylindole, 1-(3-hydroxypropyl)indole, 2-phenylindole, 1-benzylindole, 2-phenyl-1-methylindole, 2-cyanoindole, 5-chloroindole, 3-bromo-1-methylindole, or any combination thereof and the like.

Suitable indolizine compounds which can be employed herein include, for example, those represented by the following formula U

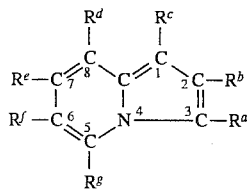

Formula U.

wherein each $R^a$, $R^b$, $R^c$, $R^d$, $R^e$, $R^f$ and $R^g$ is independently hydrogen, or a hydrocarbyl group having suitably from 1 to about 18, more suitably from 1 to about 9, carbon atoms or such hydrocarbyl groups containing an oxygen, sulfur, cyano or halogen or the like substituent. Suitable indolizine compounds include, for example, indolazine, 1-methylindolizine, 2-methylindolizine, 3-butylindolizine, 5-methyl-1-propylindolizine, 2-ethyl-1-methylindolizine, 6-(3-hydroxypropyl)indolizine, 3-phenylindolizine, 7-benzylindolizine, 2-phenyl-3-methylindolizine, 5-cyanoindolizine, 7-chloroindolizine, 3-bromo-5-methylindolizine, or any combination thereof and the like.

Suitable phenazine compounds which can be employed herein include, for example, those represented by the following formula V

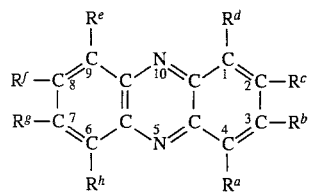

Formula V.

wherein each $R^a$, $R^b$, $R^c$, $R^d$, $R^e$, $R^f$, $R^g$ and $R^h$ is independently hydrogen, or a hydrocarbyl group having suitably from 1 to about 18, more suitably from 1 to about 9, carbon atoms or such hydrocarbyl groups containing an oxygen, sulfur, cyano or halogen or the like substituent. Suitable phenazine compounds which can be employed herein include, for example, phenazine, 1-methylphenazine, 2-methylphenazine, 2-butylphenazine, 1-methyl-7-propylphenazine, 1-ethyl-4-methylphenazine, 2-(3-hydroxypropyl)phenazine, 1-phenylphenazine, 1-benzylphenazine, 1-phenyl-7-methylphenazine, 2-cyanophenazine, 1-chlorophenazine, 1-bromo-2-methylphenazine, or any combination thereof and the like.

Suitable phenarsazine compounds which can be employed herein include, for example, those represented by the following formula W

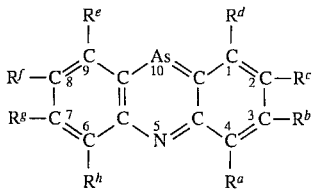

Formula W.

wherein each $R^a$, $R^b$, $R^c$, $R^d$, $R^e$, $R^f$, $R^g$ and $R^h$ is independently hydrogen, or a hydrocarbyl group having suitably from 1 to about 18, more suitably from 1 to about 9, carbon atoms or such hydrocarbyl groups containing an oxygen, sulfur, cyano or halogen or the like substituent. Suitable phenarsazine compounds which can be employed herein include, for example, phenarsazine, 1-methylphenarsazine, 2-methylphenarsazine, 4-butylphenarsazine, 1-methyl-6-propylphenarsazine, 2-ethyl-3-methylphenarsazine, 1-(3-hydroxypropyl)phenarsazine, 4-phenylphenarsazine, 3-benzylphenarsazine, 2-phenyl-7-methylphenarsazine, 3-cyanophenarsazine, 1-chlorophenarsazine, 1-bromo-8-methylphenarsazine, or any combination thereof and the like.

Suitable phenothiazine compounds which can be employed herein include, for example, those represented by the following formula X

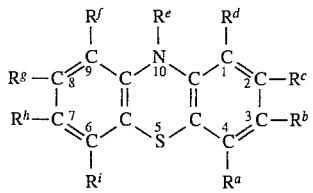

Formula V.

wherein each $R^a$, $R^b$, $R^c$, $R^d$, $R^e$, $R^f$, $R^g$, $R^h$ and $R^i$ is independently hydrogen, or a hydrocarbyl group having suitably from 1 to about 18, more suitably from 1 to about 9, carbon atoms or such hydrocarbyl groups containing an oxygen, sulfur, cyano or halogen or the like substituent. Suitable phenothiazine compounds include, for example, phenothiazine, 10-methylphenothiazine, 1-methylphenothiazine, 2-butylphenothiazine, 10-methyl-4-propylphenothiazine, 2-ethyl-3-methyl-phenothiazine, 4-(3-hydroxypropyl)phenothiazine, 10-phenylphenothiazine, 1-benzylphenothiazine, 10-phenyl-4-methylphenothiazine, 7-cyanophenothiazine, 4-chlorophenothiazine, 4-bromo-10-methylphenothiazine, or any combination thereof and the like.

Suitable pyrroline compounds which can be employed herein include, for example, those represented by the following formula Y

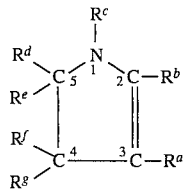

Formula Y.

wherein each $R^a$, $R^b$, $R^c$, $R^d$, $R^e$, $R^f$ and $R^g$ is independently hydrogen, or a hydrocarbyl group having suitably from 1 to about 18, more suitably from 1 to about 9, carbon atoms or such hydrocarbyl groups containing an oxygen, sulfur, cyano or halogen or the like substituent. Suitable pyrroline compounds include, for example, pyrroline, 2-methylpyrroline, 4-methylpyrroline, 5-butylpyrroline, 5-methyl-1-propylpyrroline, 1-ethyl-3-methylpyrroline, 1-(3-hydroxypropyl)pyrroline, 5-phenylpyrroline, 1-benzylpyrroline, 1-phenyl-4-methylpyrroline, 3-cyanopyrroline, 5-chloropyrroline, 2-bromo-1-methylpyrroline, or any combination thereof and the like.

Suitable indoline compounds which can be employed herein include, for example, those represented by the following formula Z

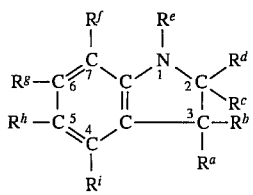

Formula Z.

wherein each $R^a$, $R^b$, $R^c$, $R^d$, $R^e$, $R^f$, $R^g$, $R^h$ and $i^g$ is independently hydrogen, or a hydrocarbyl group having suitably from 1 to about 18, more suitably from 1 to about 9, carbon atoms or such hydrocarbyl groups containing an oxygen, sulfur, cyano or halogen or the like substituent. Particularly suitable indoline compounds include, for example, indoline, 1-methylindoline, 2-methylindoline, 3-butylindoline, 1-methyl-2-propyl-indoline, 2-ethyl-2-methylindoline, 1-(3-hydroxy-propyl)indoline, 1-phenylindoline, 1-benzylindoline, 1-phenyl-2-methylindoline, 5-cyanoindoline, 7-chloroindoline, 5-bromo-1-methylindoline, or any combination thereof and the like.

Suitable piperidine compounds which can be employed herein include, for example, those represented by the following formula AA

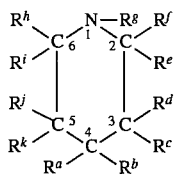

Formula AA.

wherein each $R^a$, $R^b$, $R^c$, $R^d$, $R^e$, $R^f$, $R^g$, $R^h$, $R^i$, $R^j$ and $R^k$ is independently hydrogen, or a hydrocarbyl group having suitably from 1 to about 18, more suitably from 1 to about 9, carbon atoms or such hydrocarbyl groups containing an oxygen, sulfur, cyano or halogen or the like substituent. Suitable piperidine compounds which can be employed herein include, for example, piperidine, 1-methylpiperidine, 2-methylpiperidine, 3-butylpiperidine, 1-methyl-2-propylpiperidine, 2-ethyl-4-methylpiperidine, 1-(3-hydroxypropyl)piperidine, 1-phenylpiperidine, 1-benzylpiperidine, 1-phenyl-2-methylpiperidine, 4-cyanopiperidine, 3-chloropiperidine, 4-bromo-1-methylpiperidine, or any combination thereof and the like.

Suitable piperazine compounds which can be employed herein include, for example, those represented by the following formula BB

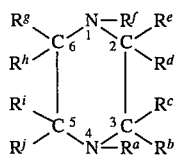

Formula BB.

wherein each $R^a$, $R^b$, $R^c$, $R^d$, $R^e$, $R^f$, $R^g$, Rh, $R^i$ and $R^j$ is independently hydrogen, or a hydrocarbyl group having suitably from 1 to about 18, more suitably from 1 to about 9, carbon atoms or such hydrocarbyl groups containing an oxygen, sulfur, cyano or halogen or the like substituent. Particularly suitable piperazine compounds which can be employed herein include, for example, piperazine, 1-methylpiperazine, 2-methylpiperazine, 3-butylpiperazine, 1-methyl-4-propylpiperazine, 1-ethyl-3-methylpiperazine, 1-(3-hydroxypropyl)-piperazine, 2-phenylpiperazine, 1-benzylpiperazine, 1-methyl-3-phenylpiperazine, 2-cyanopiperazine, 2-chloropiperazine, 1,4-dimethyl-2-bromopiperazine, or any combination thereof and the like.

The acids having a weak nucleophilic anion can contain boron or be free of boron.

Suitable boron containing acids include, for example, those represented by the formula $HBR_3R'$ wherein each R is independently hydrogen or an aliphatic, cycloaliphatic or aromatic hydrocaron or substituted hydrocarbon group having suitably from 1 to about 12, more suitably from about 1 to about 6, most suitably from about 1 to about 4, carbon atoms; and R' is a group other than a hydrocarbyl group such as, for example, a hydrocarbonoxy, hydrocarbonamino, a hydrocarbonphosphino, or a halogen atom, particularly fluorinet chlorine or bromine. The term hydrocarbon means any aliphatic, cycloaliphatic, aromatic, arylsubstituted aliphatic, alkyl substituted aromatic groups.

Fluoboric acid is sometimes referred to as fluoroboric acid or hydrogen tetrafluoroborate. Any of these expressions refer to the chemical represented by the formula $HBF_4$.

Suitable such acids containing boron include, for example, hydrogen fluorotriphenylborate, hydrogen chlorotriphenylborate, hydrogen fluorotributylborate, hydrogen phenyltrifluoborate or chloroboric acid. Most particularly suitable such acid is fluoboric acid.

The term hydrocarbonoxy means that a hydrocarbyl group as previously defined has an oxygen atom between it and the boron atom. Likewise, the term hydrocarbonamino and hydrocarbonphosphino mean that there is an amine or phosphine group between the hydrocarbyl group and the boron atom.

Particularly suitable acids which are free of boron, said acid having a weak nucleophilic anion include, for example, fluoarsenic acid, acid, fluophosphoric acid, chloroarsenic acid, chloroantimonic acid, chlorophosphoric acid, nitric acid, hydrofluoric acid, trifluoroacetic acid, trifluoromethanesulfonic acid, picric acid or any combination thereof and the like.

Suitable metal salts of such boron-free or boron containing acids having a weak nucleophilic anion include, for example, salts containing the metals of Groups I and II of the Periodic Table of the Elements published by Sargent-Welch Scientific Company as catalog number S-18806. Particularly, such salts include, for example, the sodium, potassium, lithium, calcium, barium, magnesium and silver salts of such acids.

Suitable compounds having an average of more than one epoxide group per molecule which can be employed herein include, epoxy resins such as, for example, the glycidyl ethers of polyhydric phenols such as dihydroxy phenols, biphenols, bisphenols, halogenated bisphenols, alkylated bisphenols, trisphenols, phenolaidehyde novolac resins, substituted phenol-aldehyde novolac resins, phenol-hydrocarbon resins, substituted phenol-hydrocarbon resins, or any combination thereof and the like. Suitable such epoxy resins include, for example, those represented by the following formulas XXIX—XXXII

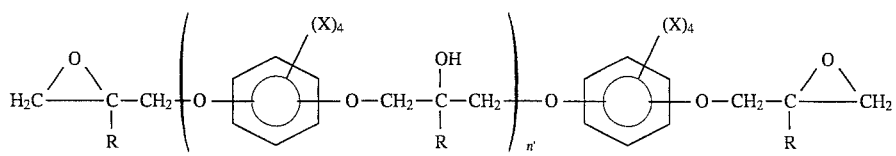

Formula XXIX.

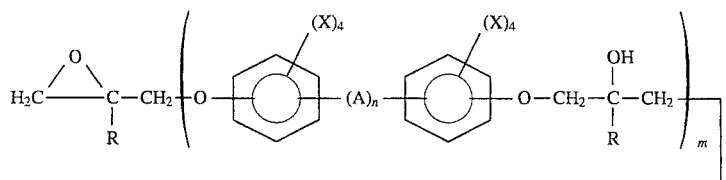

Formula XXX.

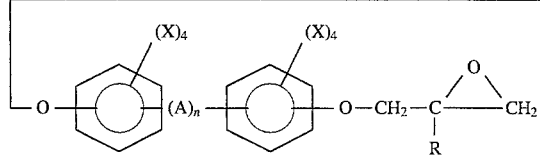

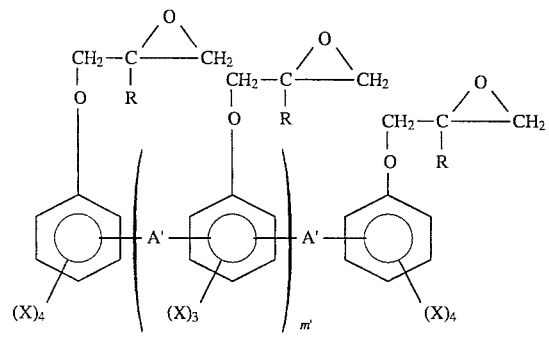

Formula XXXI.

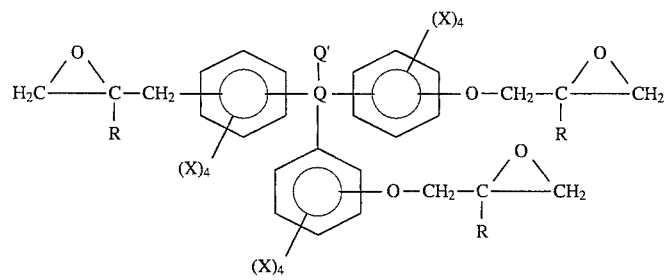

Formula XXXII.

wherein each A is independently a divalent hydrocarbyl group having from 1 to about 9, preferably from 1 to about 4, carbon atoms, —O—, —S—, —S—S—, —SO—, —SO$_2$—, or —CO—; each A' is independently a divalent hydrocarbyl group having from 1 to about 9, preferably from 1 to about 4 carbon atoms; Q is a hydrocarbyl group having from 1 to about 10 carbon atoms; Q' is hydrogen or an alkyl group having from 1 to about 4 carbon atoms; each R is independently hydrogen or an alkyl group having from 1 to about 4 carbon atoms; each X is independently hydrogen, bromine, chlorine, or a hydrocarbyl group having from 1 to about 9, preferably from 1 to about 4 carbon atoms; m has an average value from zero to about 12, preferably from about zero to about 9, most preferably from about 0.03 to about 3; m' has a value from about 0.01 to about 10, preferably from about 0.2 to about 8, more preferably from about 0.5 to about 6; n has a value of zero or 1; and n' has an average value of from zero to about 10, preferably from zero to about 5, most preferably from about 0.03 to about 3. Also suitable are the oligomers of the epoxy resin represented by formula XXXII.

Particularly suitable such epoxy resins include, for example, the diglycidyl ethers of resorcinol, catechoir hydroquinone, biphenol, bisphenol A, bisphenol K, tetrabromobisphenol A, phenol-formaldehyde novolac resins, alkyl substituted phenol-formaldehyde resins, phenol-hydroxybenzaldehyde resins, cresol-hydroxybenzaldehyde resins, dicyclopentadienephenol resins, tetramethylbiphenol, tetramethyltetrabromobiphenol, tetramethyltribromobiphenol, tetrachlorobisphenol A, or any combination thereof and the like.

Also suitable as the epoxide compound which can be employed in the present invention include those partially advanced epoxy resins disclosed by Bertram et al. in U.S. Pat. No. 4,594,291 which is incorporated herein by reference.

Also suitable as the epoxide compound are the glycidyl ethers of compounds having an average of more than one aliphatic hydroxyl group per molecule such as, for example, aliphatic diols, polyether diols, polyether triols, polyether tetrols, or any combination thereof and the like. Also suitable are the alkylene oxide adducts of compounds containing an average of more than one aromatic hydroxyl group per molecule such as, for example, the ethylene oxide, propylene oxide, or butylene oxide adducts of dihydroxy phenols, biphenols, bisphenols, halogenated bisphenols, alkylated bisphenols, trisphenols, phenol-aldehyde novolac resins, halogenated phenol-aldehyde novolac resins, alkylated phenol-aldehyde novolac resins, hydrocarbon-phenol resins, hydrocarbon-halogenated phenol resins, or hydrocarbon-alkylated phenol resins, or or any combination thereof and the like.

Suitable aromatic hydroxyl containing compounds which can be employed herein include, for example, compounds having an average of more than one phenolic hydroxyl group per molecule. Suitable such compounds include, for example, dihydroxy phenols, biphenols, bisphenols, halogenated bisphenols, alkylated bisphenols, trisphenols, phenol-aldehyde resins, halogenated phenol-aldehyde novolac resins, alkylated phenol-aldehyde novolac resins, phenolhydroxybenzaldehyde resins, alkylated phenolhydroxybenzaldehyde resins, hydrocarbon-phenol resins, hydrocarbon-halogenated phenol resins, hydrocarbon-alkylated phenol resins, or any combination thereof and the like. Particularly suitable aromatic hydroxyl-containing compounds include, for example, those represented by the following formulas XXXII—XXXV

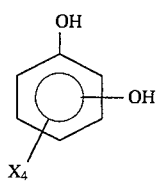
Formula XXXII.

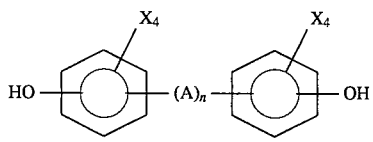
Formula XXXIII.

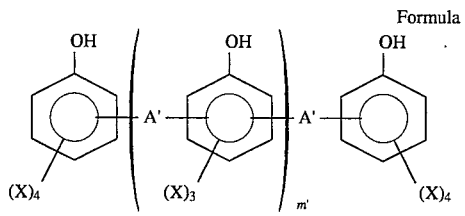
Formula XXXIV.

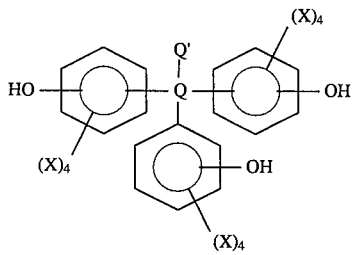
Formula XXXV.

wherein A, A', Q, Q' X, n and m are as defined above in formulas XII—XVI. Particularly suitable aromatic hydroxyl-containing materials include, for example, biphenol, bisphenol A, bisphenol K, tetrabromobisphenol A, tetrabromobisphenol K, resorcinol, phenol-aldehyde novolac resins, cresol-aldehyde novolac resins, phenol-hydroxybenzaldehyde resins, cresol-hydroxybenzaldehyde resins, tetramethylbiphenol, tetramethyltribromobiphenol, tetramethyltetrabromobiphenol, tetrachlorobisphenol A, or any combination thereof and the like. Also suitable are the oligomers of the multifunctional phenolic compounds represented by the formula XXXV.

These and other suitable aromatic hydroxyl-containing compounds are disclosed in U.S. Pat. No. 4,594,291 issued Jun. 10, 1986 by Bertram et al which is incorporated herein by reference.

The aromatic hydroxyl-containing compounds are employed in amounts which provide a ratio of aromatic hydroxyl groups to epoxy groups suitably from about 0.05:1 to about 20:1, more suitably from about 0.1:1 to about 10:1, most suitably from about 0.2:1 to about 5:1.

The precatalyzed compositions of the present invention can contain, if desired, pigments, fillers, dyes, diluents, solvents, stabilizers, epoxy resin curing agents, or any combination thereof and the like.

Suitable stabilizer materials and curing agents which can be employed herein include, for example, those disclosed in the aforementioned U.S. Pat. No. 4,594,291 by Bertram et al which is incorporated herein by reference.

The compositions of the present invention are useful in the preparation of formulations for use in the preparation of electrical and structural laminates and composites, coatings, castings, moldings, encapsulants and the like. They can be employed in the conventional methods or the newer RTM and RIM techniques.

The following examples are illustrative of the invention but are not to be construed as to limiting the scope thereof in any manner.

EXAMPLE 1

Preparation of 2-methylimidazolium Fluoborate Complex

A glass flask fitted with a stirrer, thermometer, and reflux condenser is charged with 15.37 grams (0.098 mole) of a 55.9% aqueous solution, by weight, of fluoboric acid. To this stirred solution, 8.2 grams (0.100 mole) of 2-methylimidazole are slowly added during about five minutes. The heat from the reaction warmed the solution to approximately 50° C. as the 2-methylimidazole dissolves. The solution is stirred for an additional 30 minutes as it cools to near ambient temperature. Methanol is then added, 19.98 grams, to dilute the solution to 38.6% solids based on the weight of the 2-methylimidazole and fluoboric acid.

The concentration of the aqueous fluoboric acid was determined by potentiometric titration to the first inflection point with 0.100 N potassium hydroxide in methanol. An MCI GT-05 automatic titrator and a combination silver/silver chloride electrode (Curtain Matheson Scientific No. 201–947) were used to measure the pH changes during the course of the titration.

EXAMPLES 2–12

PREPARATION OF 2-METHYLIMIDAZOLIUM FLUOBORATE COMPLEXES

The procedure described in Example 1 is repeated using the same procedure and amount of 2-methylimidazole (2-MI), however the weight of fluoboric acid (55.9% aqueous solution) is varied as shown in Table I. All experiments are diluted with methanol to 38.5% solids based on the combined weights of 2-MI and fluoboric acid. The results are given in Table I.

TABLE I

| 2-METHYLIMIDAZOLE WITH VARYING RATIOS OF FLUOROBORIC ACID | | |
| --- | --- | --- |
| Example Number | Fluoroboric Acid Solution (grams) | Moles of Fluoroboric Acid Per Mole of 2-MI |
| 2 | 11.71 | 0.75 |
| 3 | 13.17 | 0.84 |
| 4 | 13.90 | 0.89 |
| 5 | 14.63 | 0.93 |
| 1 | 15.37 | 0.98 |
| 6 | 16.10 | 1.03 |

TABLE I-continued

2-METHYLIMIDAZOLE WITH VARYING RATIOS OF FLUOROBORIC ACID

| Example Number | Fluoroboric Acid Solution (grams) | Moles of Fluoroboric Acid Per Mole of 2-MI |
|---|---|---|
| 7 | 16.83 | 1.07 |
| 8 | 17.56 | 1.12 |
| 9 | 17.88 | 1.14 |
| 10 | 18.35 | 1.17 |
| 11 | 20.39 | 1.30 |
| 12 | 21.17 | 1.35 |

EXAMPLE 13

Preparation of 2-phenylimidazolium Fluoborate

A glass flask fitted with a stirrer, thermometer, and reflux condenser is charged with 15.37 grams (0,098 mole) of a 55.9% aqueous solution, by weight, of fluoboric acid and 29.3 grams of methanol. To this stirred solution, 14.4 grams (0,100 mole) of 2-phenylimidazole (2-PI) are slowly added during about five minutes. The heat from the reaction warms the solution to approximately 50° C. as the 2-phenylimidazole dissolves. The solution is stirred for an additional 30 minutes as it cools to near ambient. The product is a clear solution containing 38.9% by weight of the 2-phenylimidazolium fluoborate adduct/complex.

EXAMPLE 14

Preparation of 4-methylimidazolium Fluoborate Complex

The procedure of Example 13 is followed using the following reagents:

4.68 g (0.0487 mole) of 4-methylimidazole (4-MI)

7.84 g (0.0500 mole) of fluoboric acid (55.9% aqueous)

9.92 g of methanol

The resultant product is a clear solution containing 38.5% by weight of the 4-methylimidazolium fluoborate adduct/complex.

EXAMPLE 15

Preparation of 1,2-Dimethylimidazolium Fluoborate Complex

The procedure of Example 13 is followed using the following reagents:

4.68 g (0.0487 mole) of 1,2-dimethylimidazole (1,2 DMI)

7.84 g (0.0500 mole) of fluoboric acid (55.9% aqueous)

10.95 g of methanol

The resultant product is a clear solution containing 38.6% by weight of the 1,2-dimethylimidazolium fluoborate adduct/complex.

EXAMPLE 16

Preparation of 2-ethyl-4-methylimidazolium Fluoborate Complex

The procedure of Example 13 is followed using the following reagents:

5.36g (0.0487 mole) of 2-ethyl-4-methylimidazole (2-E-4-MI)

7.84 g (0.0500 mole) of fluoboric acid (55.9% aqueous)

11.98 g of methanol

The resultant product is a clear solution containing 38.7% by weight of the 2-ethyl-4-methylimidazolium fluoborate adduct/complex.

EXAMPLE 17

Preparation of 4,5-diphenylimidazolium fluoborate complex

The procedure of Example 13 is followed using the following reagents:

4.00 g (0.0182 mole) of 4,5-diphenylimidazole (4,5-DPI)

2.92 g (0.0166 mole) of fluoboric acid (55.9% aqueous)

7.47 g of methanol

After the above reactants are added together, the mixture is not homogeneous, therefore an additional 35.4 grams of the monomethyl ether of propylene glycol monoacetate is added to give a clear solution containing 11.3% by weight of the 4,5-diphenyl-imidazolium fluoborate adduct/complex.

EXAMPLE 18–34

Imidazolium Fluoroborate Complex Catalyzed Epoxy/phenolic Systems

The catalysts described in Examples 1–17 are mixed with a 1:1 molar ratio of a diglycidyl ether of bisphenol A having an epoxy equivalent weight of 181.5 (D.E.R.™383 Epoxy Resin commercially available from The Dow Chemical Co.) and bisphenol A (2,2-bis(4,4'-hydroxyphenyl)propane), commercially available from The Dow Chemical Co. as PARABIS™) dissolved in the monomethylether of propylene glycol monoacetate (PMA). The epoxy resin (181.5 grams, 1 equiv.), bisphenol A (114 grams, 1 equiv.) and 73.88 grams of PMA are heated between 80° C. and 100° C. under a nitrogen atmosphere until homogeneous, cooled to ambient temperature and the appropriate amount of catalyst added as described in Table II. Portions of these solutions are then stored at 50° C. and the 25° C. viscosity monitored as shown in Table III.

TABLE II

CATALYZED EPOXY/PHENOLIC FORMULATIONS

| Example or Comp. Expt. No. | Catalyst (Ex. Number) | Catalyst Solution Weight (grams) | Millimoles of Catalyst per Equivalent of Epoxide |
|---|---|---|---|
| 18 | 1 | 3.92 | 9.0 |
| 19 | 2 | 3.47 | 9.0 |
| 20 | 3 | 3.67 | 9.0 |
| 21 | 4 | 3.75 | 9.0 |
| 22 | 5 | 3.82 | 9.0 |
| 23 | 6 | 4.02 | 9.0 |
| 24 | 7 | 4.12 | 9.0 |
| 25 | 8 | 4.22 | 9.0 |
| 26 | 9 | 4.24 | 9.0 |
| 27* | 10 | 4.31 | 9.0 |
| 28* | 11 | 4.59 | 9.0 |
| 29* | 12 | 4.67 | 9.0 |
| 30 | 13 | 5.31 | 9.0 |
| 31 | 14 | 4.00 | 9.0 |
| 32 | 15 | 4.33 | 9.0 |
| 33 | 16 | 4.65 | 9.0 |
| 34 | 17 | 24.65 | 9.0 |
| C. E.[a]A* | No Cat. | — | — |
| C. E.[a]B* | 2-MI[b] | 1.85 | 9.0 |

TABLE II-continued

CATALYZED EPOXY/PHENOLIC FORMULATIONS

| Example or Comp. Expt. No. | Catalyst (Ex. Number) | Catalyst Solution Weight (grams) | Millimoles of Catalyst per Equivalent of Epoxide |
|---|---|---|---|
| C. E.[a]C* | 2-PI[c] | 3.24 | 9.0 |
| C. E.[a]D* | 1,2-DMI[d] | 2.16 | 9.0 |

*Not an example of the present invention.
[a]C. E. is Comparative Experiment
[b]2-methyl imidazole alone as catalyst. (40% by wt. solution in methanol)
[c]2-phenylimidazole alone as catalyst. (40% by wt. solution in methanol)
[d]1,2-dimethylimidazole alone as catalyst. (40% by wt. solution in methanol)

Resistance to methyl ethyl ketone is determined in the following manner. The ball end of a ball peen hammer weighing about 1.5 lbs. (0.6804 kg) is covered with 8 plys of gauze, which is then wet with methyl ethyl ketone (MEK). The ball end of the hammer is applied to the coated surface and rubbed back and forth until the coating is removed. One double rub corresponds to one back and forth movement of the hammer. The number of double rubs required to remove or mar the coating is recorded.

Flexibility is determined by a ⅛ in. wedge test using a Gardner Falling Dart Impact Tester (available from the Gardner Laboratory, Inc., Bethesda, Md.) configured for 0 to ⅛ in. ( 0 to 3,175 mm) wedge bend test. The bottom ¾ in. (19.05 mm) of the panel is bent 180° over itself, exposing the coating to the outer surface, then sandwiched between two nonparallel steel plates that are hinged such that when completely together, they form a zero to ⅛ in. (0 to 3.175

TABLE III

50° C. Stability Study

| Ex. or CE[a] | Nitrogen or Phosporus Cont. Compound | Mol. of HBF$_4$ per Mol. of N-Cont. Cmpd. | Initial Cps | Initial Pa·s | After 1 Day Cps | After 1 Day Pa·s | After 14 Days Cps | After 14 Days Pa·s | % of Control Viscosity[a] After 1 Day | % of Control Viscosity[a] After 14 Days |
|---|---|---|---|---|---|---|---|---|---|---|
| 18 | 2-MI | 0.98 | 885 | .885 | 1054 | 1.054 | 1385 | 1.385 | 10.5 | <0.7 |
| 19 | 2-MI | 0.75 | 914 | .914 | 1361 | 1.361 | N.D. | N.D. | 13.6 | N.D. |
| 20 | 2-MI | 0.84 | 904 | .904 | 1211 | 1.211 | 24150 | 24.150 | 12.1 | <12.1 |
| 21 | 2-MI | 0.89 | 891 | .891 | 1144 | 1.144 | 8890 | 8.890 | 11.4 | <4.4 |
| 22 | 2-MI | 0.93 | 887 | .887 | 1085 | 1.085 | 3120 | 3.120 | 10.8 | <1.6 |
| 23 | 2-MI | 1.03 | 877 | .887 | 1032 | 1.032 | 1251 | 1.251 | 10.3 | <0.6 |
| 24 | 2-MI | 1.07 | 840 | .840 | 957 | .957 | 1168 | 1.168 | 9.6 | <0.6 |
| 25 | 2-MI | 1.12 | 836 | .836 | 987 | .987 | 2919 | 2.919 | 9.9 | <1.5 |
| 26* | 2-MI | 1.14 | 1360 | 1.360 | >200,000[b] | >200[b] | N.D. | N.D. | N/A | N.D. |
| 27* | 2-MI | 1.17 | 1243 | 1.243 | >200,000[b] | >200[b] | — | — | >1999 | — |
| 28* | 2-MI | 1.30 | 1715 | 1.715 | >200,000[b] | >200[b] | — | — | >1999 | — |
| 29* | 2-MI | 1.35 | 2000[e] | 2.000[e] | >200,000[b] | >200[b] | — | — | >1999 | — |
| 30 | 2-PI | 0.98 | 820 | .820 | 980 | .980 | 1404 | 1.404 | 7.0 | — |
| 31 | 4-MI | 1.02 | 867 | .867 | 1020 | 1.020 | 1179 | 1.179 | — | — |
| 32 | 1,2-DMI | 1.03 | 836 | .836 | 932 | .932 | 1260 | 1.260 | 7.6 | <0.6 |
| 33 | 2-E-4-MI | 1.02 | 828 | .828 | 897 | .897 | 1140 | — | — | — |
| 34 | 4,5-DPI | 1.03 | 417 | .417 | 576 | .576 | 742 | .742 | — | — |
| A* | None | 0 | 1079 | 1.079 | 1081 | 1.081 | 1256 | 1.256 | — | — |
| B* | 2-MI[c] | 0 | 1006 | 1.006 | 10,006 | 10.006 | >200,000[b] | >200[b] | — | — |
| C* | 2-PI[c] | 0 | 1042 | 1.042 | 14,000 | 14.000 | — | — | — | — |
| D* | 1,2-DMI[c] | 0 | 1171 | 1.171 | 12,228 | 12.228 | >200,000[b] | >200[b] | — | — |

FOOTNOTES TO TABLE III
*Not an example of the present invention.
[a]Examples are designated by numerals whereas comparative experiments are designated by letters.
[b]Viscosity of the composition exceeded the test method (>200,000 cps).
[c]2-Methylimidazole, 2-phenylimidazole and 1,2-dimethylimidazole employed alone as catalyst.
[d]This value is determined by dividing the viscosity obtained in the appropriate example by the viscosity of a comparable formulation employing as the catalyst the catalyst the same nitrogen or phosphorus compound except that it has not been reacted with HBF$_4$.
[e]The viscosity is increasing during measurement.

EXAMPLE 35

Coating Properties With 2-methyl-imidazolium Fluoborate Catalyst

The formulations described in Example 18 and Comparative Experiment B are applied to 24 gauge Bonderite™ R 90 treated steel panels available from Parker Chemical Co. via a wire wound steel draw down rod. The coatings are allowed to air dry for approximately five minutes, then placed in a forced air oven preset at 200° C. for 10 minutes. The panels are removed from the oven, cooled to ambient temperature, and tested as shown in Table IV.

mm) gap. The top plate is then impacted with the blunt end of the falling dart until the panel is bent from a zero to ⅛ in. (0 to 3.175 mm) wedge. The coated area over the bend is then wiped for approximately one minute with a 10% CuSO$_4$/1N HCl solution which turns a copper-red color where the coating has failed and exposed steel metal. The percent pass value given in Table IV is calculated as the number of inches from the ⅛ in. (0 to 3.175 mm) end to the point of failure, as evidenced by the copper-red color, divided by the total 4 in. (101.6 mm) total length times 100.

TABLE IV

COATING PROPERTIES OF CATALYZED SYSTEMS

| SAMPLE NUMBER | FORMULATIONS FROM EXAMPLE OR COMP. EXPT. | MEK DOUBLE RUBS | GARDNER IMPACT in-lbs. | J | ⅛ in. WEDGE BEND % Pass |
|---|---|---|---|---|---|
| I | 18 | 30–50 | >180 | >20.34 | 100 |
| II* | C.E.ᵃB | >100 | >180 | >20.34 | 100 |

*Not an example of the present invention.
ᵃC.E. is Comparative Experiment.

EXAMPLE 36

Clear Casting Properties With Imidazolium Fluoborate Catalyst

Tetrabromobisphenol A 136 grams (0.5 equivalents), 181.5 grams (1.0 equivalent) of D.E.R.™ 383, 4.3 grams (0.1 equivalent) of sulfanilamide, 24.8 grams (0.4 equivalents) are stirred at 100° C.–130° C. until homogeneous, then 0.871 grams (2.0 millimoles) of the catalyst described in Example 1 is added. The mixture is stirred until homogeneous, degassed via evacuation for approximately one minute, then poured into preheated aluminum molds spaced 1/8 inch apart. The castings are cured for 16 hours at 150° C., followed by three hours at 200° C. The casting is then cooled and removed from the aluminum mold for testing as shown in Table V, Example 36.

EXAMPLE 37

Clear Casting Properties With Tetrabutylphosphonium Fluoborate Catalyst (Not An Example of Present Invention Described Herein)

Example 36 is repeated using 1.84 g (2.0 millimoles) of the catalyst described in Example 51. The testing results are shown in Table V, Example 37.

In these experiments, toughness is reported as the stress intensification factor, $K_q$. The method for measuring $K_q$ is an adaptation of ASTM E 399-83 for plastics materials from the original usage with metals. The compact tension test is now widespread in usage and is described in the *J. Mater. Sci.*, Vol., 16, 2657, 1981. An individual test piece is cut as an approximate 1 inch (25.4 mm) square from a flat casting usually of ⅛ inch (3.175 mm) thickness. A dovetail notch is cut into one edge, centered, about ¼ inch (6.25 mm) in depth. Next, a razor blade is inserted into this notch and tapped to produce a precrack. Tow holes are then drilled adjacent to the dovetail as indicated in ASTM E 399-83, allowing the test piece to be pinned into position in the Instron test machine. Extension of the sample now allows the force required to propagate opening of the precrack to be measured, using a test speed of 0.02 inches/minute (0.0085 mm/sec.). This force is used in the equation given in ASTM E-399, along with the required sample dimensions and actual precrack length, to calculate a "stress intensification factor", $K_Q$. This method is described by Lee, L. H. in *Physicochemical Aspects of Polymer Surfaces*, K. L. Mittair ed., Plenum Press, New York, N.Y., 1983.

In these experiments, glass transition temperature (Tg) is measured by differential scanning calorimetry (DSC) using a calibrated DuPont Instrument (Model No. 912 with a 1090 controller). Samples are run under a nitrogen atmosphere with a temperature ramp of 10° C. per minute (0.1667° C./sec. ).

TABLE V

CLEAR CASTING PROPERTIES OF CURED RESIN COMPOSITIONS

| EXAMPLE NUMBER | CATALYST FROM EXAMPLE OR COMP. EXPT. | Glass Trans. Temp. °C. | Toughness $K_q$ psi × in$^{0.5}$ | MPa · M$^{0.5}$ |
|---|---|---|---|---|
| 36 | 1 | 154 | 890 | 0.979 |
| 37* | 52 | 145 | 990 | 1.089 |

*Not an example of the present invention.

EXAMPLE 38

Preparation of Ethyltriphenylphosphonium Fluoborate Complex (Not An Example of Present Invention Described Herein)

A glass flask fitted with a stirrer, thermometer, and reflux condenser is charged with 11.4 grams of a 71.9% methanol solution, by weighty of ethyltriphenylphosphonium acetate-acetic acid (ETPPA.HAc) complex (0.0200 moles). To this stirred solution, 3.682 grams (0.0224 moles) of a 53.4% by weight aqueous solution of fluoboric acid (1.12 moles per mole of ETPPA.HAc) are slowly added during about five minutes. The heat from the reaction warms the solution to approximately 50° C. The solution is stirred for an additional 30 minutes as it cooled to near ambient temperature. Methanol is then added, 10.22 grams, to dilute the solution to 40% solids based on the weight of the ethyltriphenylphosphonium fluoborate complex.

The weight percent of ETTPA.HAc in methanol was determined by titration of the acetate group with 0.1006 N perchloric acid (HClO$_4$) in acetic acid to a crystal violet endpoint (blue to green endpoint). It required 12.80 ml (0.001280 moles) of perchloric acid solution to titrate 0.7295 g of ETPPA.HAc/methanol solution dissolved in 15 ml of dichloromethane, which calculates to 71.9 wt. % of ETPPA.HAc in methanol.

EXAMPLES 39–45

Preparation of Ethyltriphenylphosphonium Fluoborate Complexes (Not an Example of Present Invention Described Herein)

The procedure described in Example 38 is repeated using the same procedure and amount of ETPPA.HAc, however the weight of fluoboric acid (53.4% aqueous solution) is varied as shown in Table IV. All experiments are diluted with methanol to 40% solids based on the combined weights of ETPPA.HAc and fluoboric acid.

TABLE IV

ETHYLTRIPHENYLPHOSPHONIUM FLUOBORATE COMPLEXES WITH VARYING RATIOS OF FLUOBORIC ACID

| EXAMPLE NUMBER | FLUOBORIC ACID SOL. (grams) | MOLES FLUOBORIC ACID PER MOLE OF ETPPA · HAc |
|---|---|---|
| 39* | 3.123 | 0.95 |
| 40* | 3.353 | 1.02 |
| 41* | 3.517 | 1.07 |
| 38* | 3.682 | 1.12 |
| 42* | 3.876 | 1.17 |
| 43* | 4.010 | 1.22 |
| 44* | 4.175 | 1.27 |
| 45* | 4.339 | 1.32 |
| C.E.$^a$E* | 0.0$^b$ | 0.0 |

*Not an example of the present invention.
$^a$C.E. is Comparative Experiment.
$^b$Ethyltriphenylphosphonium acetate · acetic acid complex alone as catalyst.

EXAMPLE 46

Preparation of Tetrabutylphosphonium Fluoborate Complex (Not an Example of Present Invention Described Herein)

A glass flask fitted with a stirrer, thermometer, and reflux condenser is charged with 6.20 grams (0.01 moles) of a 60.9% methanol solution, by weight, of tetrabutylphosphonium acetate-acetic acid complex (TBPA.HAc). To this stirred solution, 2.00 grams (0.0122 moles) of a 53.4% by weight aqueous solution of fluoboric acid (1.22 moles per mole of TBPA.HAc) are slowly added during about five minutes. The heat from the reaction warms the solution to approximately 50° C. The solution is stirred for an additional 30 minutes as it cooled to near ambient temperature. Methanol is then added, 3,916 grams, to dilute the solution to 40% solids based on the weight of the tetrabutylphosphonium fluoborate complex.

The weight percent of TBPA.HAc in methanol was determined by titration of the acetate group with 0.1006 N perchloric acid (HClO$_4$) in acetic acid to a crystal violet endpoint (blue to green endpoint). It required 10.15 ml (0.001015 moles) of perchloric acid solution to titrate 0.6301 g of TBPA.HAc/methanol dissolved in 15 ml of dichloromethane, which calculates to 60.9 wt. % TBPA.HAc in methanol.

EXAMPLES 47–54

Preparation of Tetrabutylphosphonium Fluoborate Complexes (Not an Example of Present Invention Described Herein)

The procedure described in Example 46 is repeated using the same procedure and amount of tetrabutylphosphonium acetate-acetic acid complex (TBPA.HAc), however the weight of fluoboric acid (53.42% aqueous solution) is varied as shown in Table V. All experiments were diluted with methanol to 40% solids based on the combined weights of TBPA.HAc and fluoboric acid.

TABLE V

TETRABUTYLPHOSPHONIUM FLUOBORATE COMPLEXES WITH VARYING RATIOS OF FLUOBORIC ACID

| EXAMPLE NUMBER | FLUOBORIC ACID SOL. (grams) | MOLES FLUOBORIC ACID PER MOLE OF TBPA · HAc |
|---|---|---|
| 47* | 1.56 | 0.95 |
| 48* | 1.67 | 1.02 |
| 49* | 1.759 | 1.07 |
| 50* | 1.84 | 1.12 |
| 51* | 1.923 | 1.17 |
| 46* | 2.005 | 1.22 |
| 52* | 2.05 | 1.25 |
| 53* | 2.087 | 1.27 |
| 54* | 2.17 | 1.32 |
| C.E.$^a$F* | 0.0$^b$ | 0.0 |

*Not an example of the present invention.
$^a$C.E. is Comparative Experiment.
$^b$Tetrabutylphosphonium acetate · acetic acid complex alone as catalyst.

EXAMPLES 55–63

Preparation of Other Fluoborate Complexes

The procedure of Example 38 is followed, using a ratio of 1.02 moles of fluoboric acid per equivalent of nitrogen containing compound as described in Table VI. Methanol is added to bring the percent solids based on the amine compound-fluoborate complex to 40% by weight.

TABLE VI

TETRABUTYLPHOSPHONIUM FLUOBORATE COMPLEXES WITH VARYING RATIOS OF FLUOBORIC ACID

| EXAMPLE NUMBER | NITROGEN CONTAINING COMPOUND |
|---|---|
| 55 | PYRROLIDINE |
| 56 | N-METHYLMORPHOLINE |
| 57 | MORPHOLINE |
| 58* | BUTYLAMINE |
| 59* | DIBUTYLAMINE |
| 60* | TRIBUTYLAMINE |
| 61* | DIETHYLANILINE |
| 62 | 1-METHYLPYRROLIDINE |
| 63 | PYRIDINE |

*Not an example of present invention.

EXAMPLE 64

Fluoborate Complex Via Silver Fluoborate (Not an Example of Present Invention Described Herein)

Vacuum dried tetrabutylphosphonium chloride, 1.82 grams (0.0062 moles) is dissolved in 5.84 grams of methanol and added dropwise to 1.20 grams (0.0062 moles) of silver fluoborate dissolved in 3.46 grams of methanol. The suspension is stirred at 25° C. for 30 minutes, and the silver chloride removed by filtration. The tetrabutylphosphonium fluoborate solution is concentrated to 40% solids by weight via vacuum removal of the excess methanol.

EXAMPLE 65

Fluoborate Complex Catalyzed Epoxy/phenolic Systems

The catalysts described in Examples 38 to 64 are mixed with a 1:1 molar ratio of a diglycidyl ether of bisphenol A having an epoxy equivalent weight of 181.5 (D.E.R.™ 383

Epoxy Resin commercially available from The Dow Chemical Company) and bisphenol A (2,2-bis(4,4'-hydroxyphenyl-)propane, PARABIS™ commercially available from The Dow Chemical Company) dissolved in the monomethylether of propylene glycol monoacetate (PMA). The epoxy resin (181.5 grams), bisphenol A (114 grams) and 73.88 grams of PMA are heated to 80°–100° C. under a nitrogen atmosphere until homogeneous, cooled to ambient temperature and 9.0 millimoles of catalyst added to 1.00 equivalent of epoxide in a manner that is described previously for Examples 18–34. Portions of these solutions are then stored at 50° C. and the 25° C. viscosity monitored as shown in Table VII.

What is claimed is:

1. A curable composition which comprises:
   (1) a compound which contains on average more than 1 epoxy group per molecule;
   (2) a compound which contains on average more than 1 phenolic hydroxyl group per molecule; and
   (3) a catalytic amount of a catalyst compound which contains:
      (a) a cation containing at least one heterocyclic nitrogen-containing ring, and
      (b) an anion which is a conjugate base of fluoroarsenic acid, fluoroantimonic acid, fluorophosphoric acid,

TABLE VII

50° C. Stability Study

| Catalyst from Ex. or CE[a] | Phosporus Cont. Compound | Mol. of HBF$_4$ per Mol. of P Cont. Cmpd. | Viscosity Initial Cps | Pa · s | After 1 Day Cps | Pa · s | After 14 Days Cps | Pa · s | % of Control Viscosity[f] After 1 Day | After 14 Days |
|---|---|---|---|---|---|---|---|---|---|---|
| 39* | ETPPA · HAc | 0.95 | 364 | .364 | 460 | .460 | — | — | <0.2 | — |
| 40* | ETPPA · HAc | 1.02 | 366 | .366 | 408 | .408 | 13565 | 13.565 | <0.2 | <6.8 |
| 41* | ETPPA · HAc | 1.07 | 356 | .356 | 385 | .385 | 1014 | 1.014 | <0.2 | <0.5 |
| 38* | ETPPA · HAc | 1.12 | 348 | .348 | 370 | .370 | 543 | .543 | <0.2 | <0.3 |
| 42* | ETPPA · HAc | 1.17 | 348 | .348 | 391 | .391 | 623 | .623 | <0.2 | <0.3 |
| 43* | ETPPA · HAc | 1.22 | 436 | .436 | 749 | .749 | 1352 | 1.352 | <0.4 | <0.7 |
| 44* | ETPPA · HAc | 1.27 | 755 | .755 | 3204 | .3204 | — | — | <1.6 | — |
| 45* | ETPPA · HAc | 1.32 | 2211 | 2.211 | 10000 | 10.000 | — | — | <5.0 | — |
| 47* | TBPA · HAc | 0.95 | 401 | .401 | 570 | .570 | — | — | 1.2 | — |
| 48* | TBPA · HAc | 1.02 | 389 | .389 | 460 | .460 | — | — | 1.0 | — |
| 49* | TBPA · HAc | 1.07 | 383 | .383 | 444 | .444 | 24378 | 24.378 | .9 | 12.2 |
| 50* | TBPA · HAc | 1.12 | 377 | .377 | 430 | .430 | 6490 | 6.490 | .9 | 3.2 |
| 51* | TBPA · HAc | 1.17 | 387 | .387 | 407 | .407 | 733 | .733 | .9 | .4 |
| 46* | TBPA · HAc | 1.22 | 376 | .376 | 393 | .393 | 572 | .572 | .8 | .3 |
| 52* | TBPA · HAc | 1.25 | 540 | 0.540 | 1457 | 1.457 | — | — | 0.7 | — |
| 53* | TBPA · HAc | 1.27 | 385 | .385 | 462 | .462 | 841 | .841 | 1.0 | .4 |
| 54* | TBPA · HAc | 1.32 | 407 | .407 | 936 | .936 | 5900 | 5.900 | 2.0 | 3.0 |

| Catalyst from Ex. or CE[a] | Nitrogen Cont. Compound | Mol. of HBF$_4$ per Mol. of N Cont. Cmpd. | Viscosity Initial Cps | Pa · s | After 1 Day Cps | Pa · s | After 14 Days Cps | Pa · s | % of Control Viscosity[f] After 1 Day | After 14 Days |
|---|---|---|---|---|---|---|---|---|---|---|
| 55 | Pyrrolidine | 1.03 | 830 | 0.830 | 1136 | 1.136 | 1416 | 1.416 | — | — |
| 56 | N-methyl morpholine | 1.03 | 718 | 0.718 | 845 | 0.845 | 1113 | 1.113 | 3.1 | <5.6 |
| 55 | Morpholine | 1.03 | 833 | 0.833 | 997 | 0.997 | 1412 | 1.412 | — | — |
| 58* | Butyl amine | 1.03 | 720 | .720 | 889 | 0.889 | 1268 | 1.268 | — | — |
| 59* | Dibutyl amine | 1.03 | 602 | .602 | 684 | 0.684 | 1049 | 1.049 | 3.4 | .5 |
| 60* | Tributyl amine | 1.03 | 494 | .494 | 580 | 0.580 | 849 | 0.849 | — | — |
| C.E.I* | 4-Phenyl morpholine | 1.03 | 688 | .688 | >2000 g | >200 g | — | — | — | — |
| 61* | N,N-Diethyl- | 1.03 | 667 | .667 | 865 | 0.865 | — | — | — | — |
| 62 | 1-Methyl pyrrolidine | 1.03 | 663 | .663 | 810 | .810 | 1193 | 1.193 | — | — |
| 63* | Pyridine | 1.03 | 733 | .733 | 884 | .884 | 1484 | 1.484 | — | — |
| C.E.[a]E* | ETPPA · HAc[b] | 0 | 1053 | 1.053 | >200,000 g | >200 | — | — | — | — |
| C.E.[a]F* | TBPA · HAc[c] | 0 | 898 | .898 | 47,577 | 47.557 | >200,000 g | >200 | — | — |
| C.E.[a]G* | Dibutylamine[d] | 0 | 1169 | 1.169 | 20,328 | 20.328 | >200,000 g | >200 | — | — |
| C.E.[a]H* | N-Methyl-morpholine[e] | 0 | 1330 | 1.330 | 26,999 | 26.999 | >200,000 g | >200 | — | — |

*Not an example of the present invention.
[a]Examples are designated by numerals whereas comparative experiments are designated by letters.
[b]Ethyltriphenylphosphonium acetate · acetic acid complex employed alone as catalyst.
[c]Tetrabutylphosphonium acetate · acetic acid complex employed alone as catalyst.
[d]Dibutylamine employed alone as catalyst.
[e]N-methylmorpholine employed alone as catalyst.
[f]This value is determined by dividing the viscosity obtained in the appropriate example by the viscosity of a comparable formulation employing as the catalyst the same nitrogen or phosphorus compound except that it has not been reacted with HBF$_4$.
[g]Composition viscosity exceeded the test method (>200,000 cps).

chloroarsenic acid, chloroantimonic acid, chlorophosphoric acid, nitric acid, hydrofluoric acid, trifluoroacetic acid, trifluoromethane sulfonic acid, picric acid, fluoboric acid, or an acid represented by the Formula:

HBR$_3$R' wherein each R is independently a hydrocarbyl or substituted hydrocarbyl group and R' is a halogen, a hydrocarbonoxy group, a hydrocarbonamino group, or a hydrocarbonphosphino group.

2. The composition of claim 1 wherein Component (1) is the glycidyl ether derivative of a polyhydric phenol.

3. The composition of claim 2 wherein the polyhydric phenol is selected from the group consisting of dihydroxyphenols, biphenols, bisphenols, halogenated bisphenols, alkylated bisphenols, trisphenols, and novolac resins.

4. The composition of claim 1 wherein Component (2) is selected from the group consisting of: dihydroxyphenols, biphenols, bisphenols, halogenated bisphenols, alkylated bisphenols, trisphenols, phenol-aldehyde novolac resins, halogenated phenol-aldehyde novolac resins, alkylated phenolaldehyde novolac resins, phenol-hydroxybenzaldehyde resins, alkylated phenol-hydroxybenzaldehyde resins, hydrocarbon-phenol resins, hydrocarbon-halogenated phenol resins, hydrocarbon-alkylated phenol resin, and combinations thereof.

5. The composition of claim 1 wherein Component (2) is a biphenol, a bisphenol, or a novolac resin.

6. The composition of claim 1 wherein the equivalent ratio of aromatic hydroxyl groups to epoxy groups is from about 0.2:1 to about 5:1.

7. The composition of claim 1 wherein Component (3)(a) contains at least one of the following heterocyclic moieties: imidazole, pyrazole, oxazole, imidazolidine, imidazoline, thioazole, pyrrole, pyridine, pyrazine, pyridazine, pyrrolidine, morpholine, pyrimidine, quinoxalin, quinazoline, phthalazine, quinoline, purine, indazole, indole, indolizine, phenazine, phenarsazine, phenothiazine, pyrroline, indoline, piperidine, piperazine, or combinations thereof.

8. The composition of claim 7 wherein Component (3)(a) contains a substituted or unsubstituted imidazole, pyrrolidine or morpholine moiety.

9. The composition of claim 1 wherein Component (3)(b) contains essentially no boron.

10. The composition of claim 1 wherein Component (3)(b) contains boron.

11. The composition of claim 10 wherein Component (3)(b) is the conjugate base of an acid represented by the Formula:

HBR$_3$R'.

12. The composition of claim 11 wherein each R is independently a hydrocarbon group containing from 1 to 12 carbon atoms and each R' is fluorine, chlorine or bromine.

13. The composition of claim 10 wherein Component (3)(b) is the conjugate base of fluoroboric acid.

14. The composition of claim 1 wherein Component (3)(a) contains an imidazole moiety and Component (3)(b) contains the conjugate base of fluoroboric acid.

15. The composition of claim 1 wherein the concentration of catalyst is 0.05 to 50 mmol of catalyst per epoxide equivalent.

16. The composition of claim 1 wherein the concentration of catalyst is about 0.5 to 20 mmol of catalyst per epoxide equivalent.

* * * * *